US006169341B1

(12) United States Patent
Nagai

(10) Patent No.: US 6,169,341 B1
(45) Date of Patent: Jan. 2, 2001

(54) POWER SUPPLYING ADAPTER, ELECTRONIC EQUIPMENT, AND SIGNAL TRANSMISSION SYSTEM

(75) Inventor: Tamiji Nagai, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/260,042

(22) Filed: Mar. 2, 1999

(30) Foreign Application Priority Data

Mar. 10, 1998 (JP) .................................................. 10-057867

(51) Int. Cl.[7] ........................................................ H02J 7/00
(52) U.S. Cl. ............................ 307/82; 307/75; 307/125; 320/135; 340/310.01
(58) Field of Search .................................... 320/128, 135, 320/82; 307/75, 82, 125, 126, 130; 323/128, 135; 340/825.06, 310.01, 664

(56) References Cited

U.S. PATENT DOCUMENTS

| 4,920,307 | * | 4/1990 | Iketani ................................. 307/86 |
| 5,130,634 | * | 7/1992 | Kasai ................................... 320/22 |
| 5,254,931 | * | 10/1993 | Martensson .......................... 320/22 |
| 5,325,040 | * | 6/1994 | Bogut et al. ........................ 320/22 |
| 5,734,252 | * | 3/1998 | Griffin et al. ......................... 320/2 |
| 5,859,524 | * | 1/1999 | Ettes ................................... 320/132 |
| 5,889,381 | * | 3/1999 | Wakefield ........................... 320/106 |
| 5,990,659 | * | 11/1999 | Frannhagen ......................... 320/116 |
| 6,034,504 | * | 3/2000 | Holcomb ............................ 320/110 |

* cited by examiner

Primary Examiner—Josie Ballato
Assistant Examiner—Rios Roberto
(74) Attorney, Agent, or Firm—Jay H. Maioli

(57) ABSTRACT

A power supplying adapter which is connected to an AC power source and generates a predetermined DC voltage is constructed by a power supplying unit in which a small power mode to output a small electric power and a large power mode to output a large electric power can be switched; a current detecting unit for detecting a current outputted from the power supplying unit; a signal receiving unit for receiving a signal transmitted from electronic equipment; and for control means for making the power supplying unit operative in the small power mode and making the signal receiving unit means operative when the current detected by the current detecting unit is equal to or smaller than a reference value. The electronic equipment is constructed by a signal transmitting unit for transmitting a signal to the power supplying adapter; a second control unit for controlling the signal transmitting unit; and a switching unit for switching a power source which is supplied from the power supplying adapter.

15 Claims, 35 Drawing Sheets

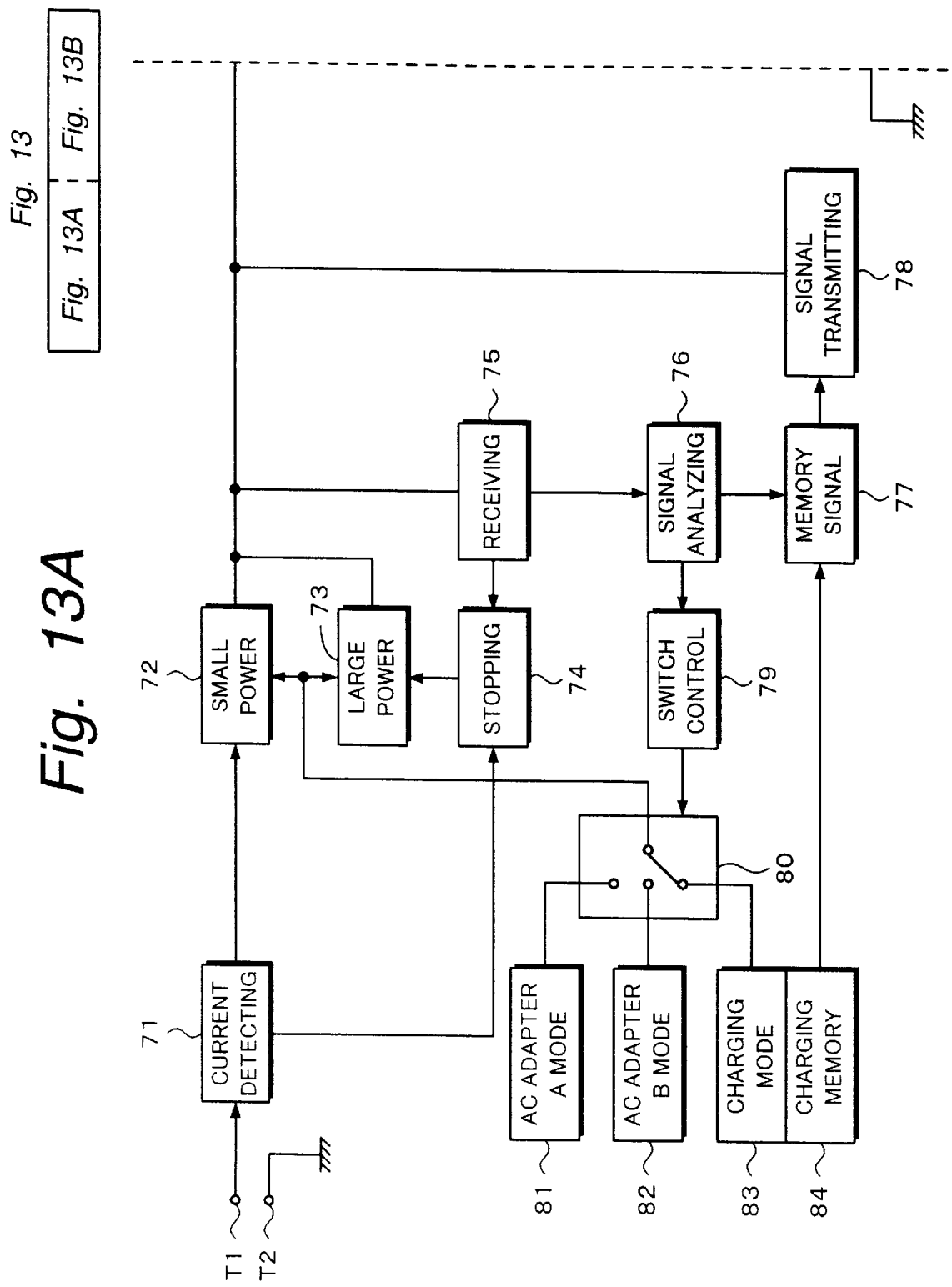

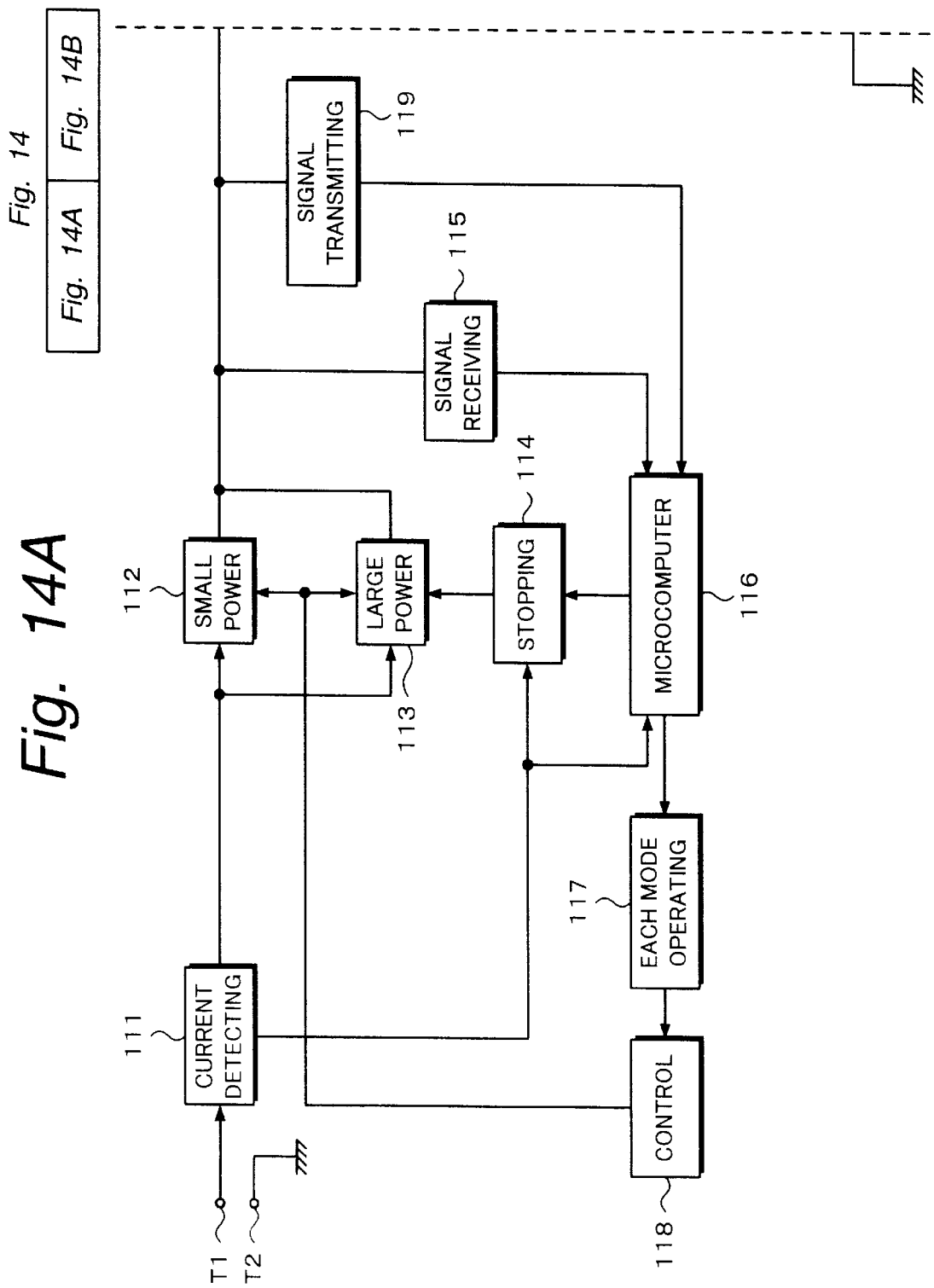

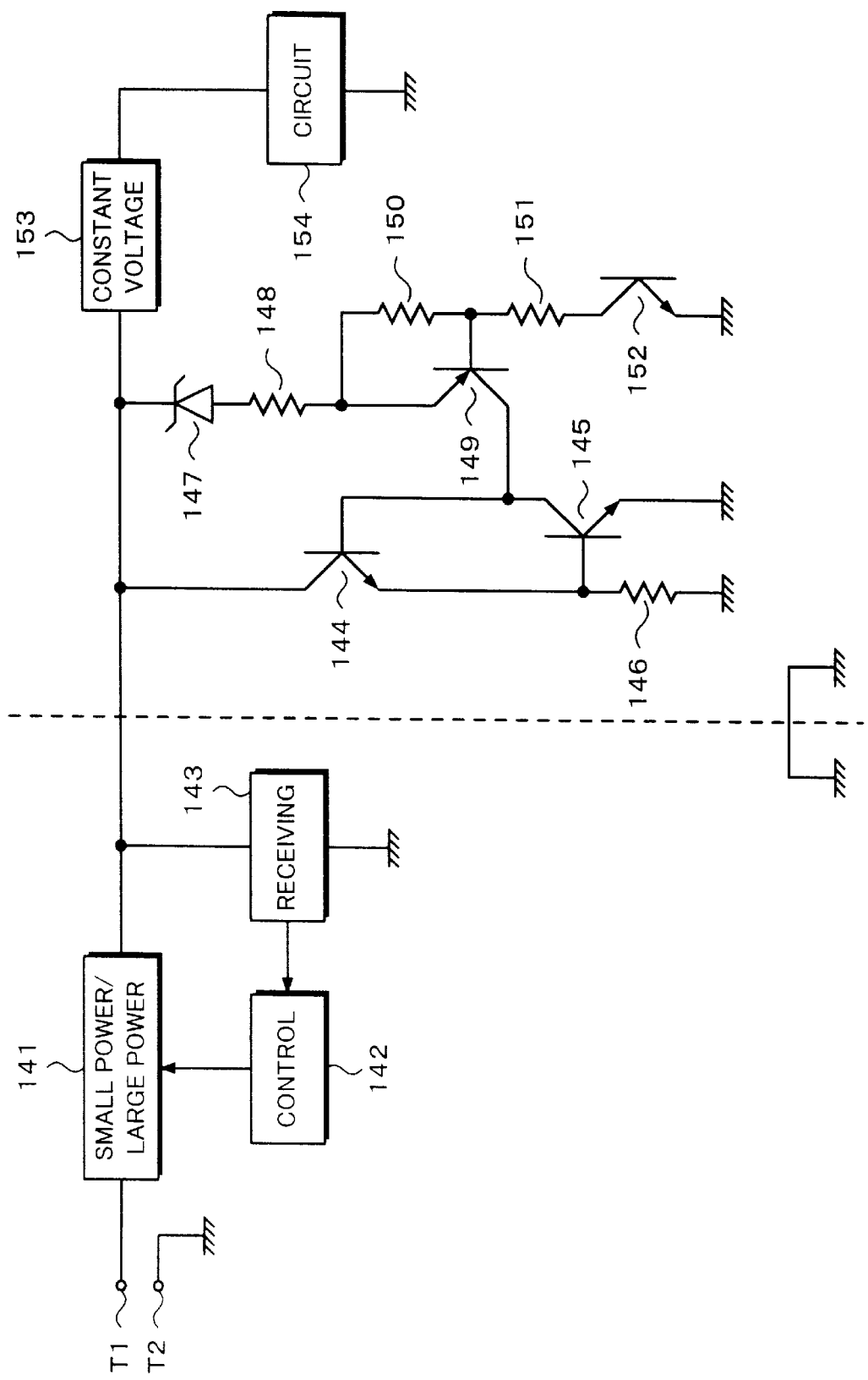

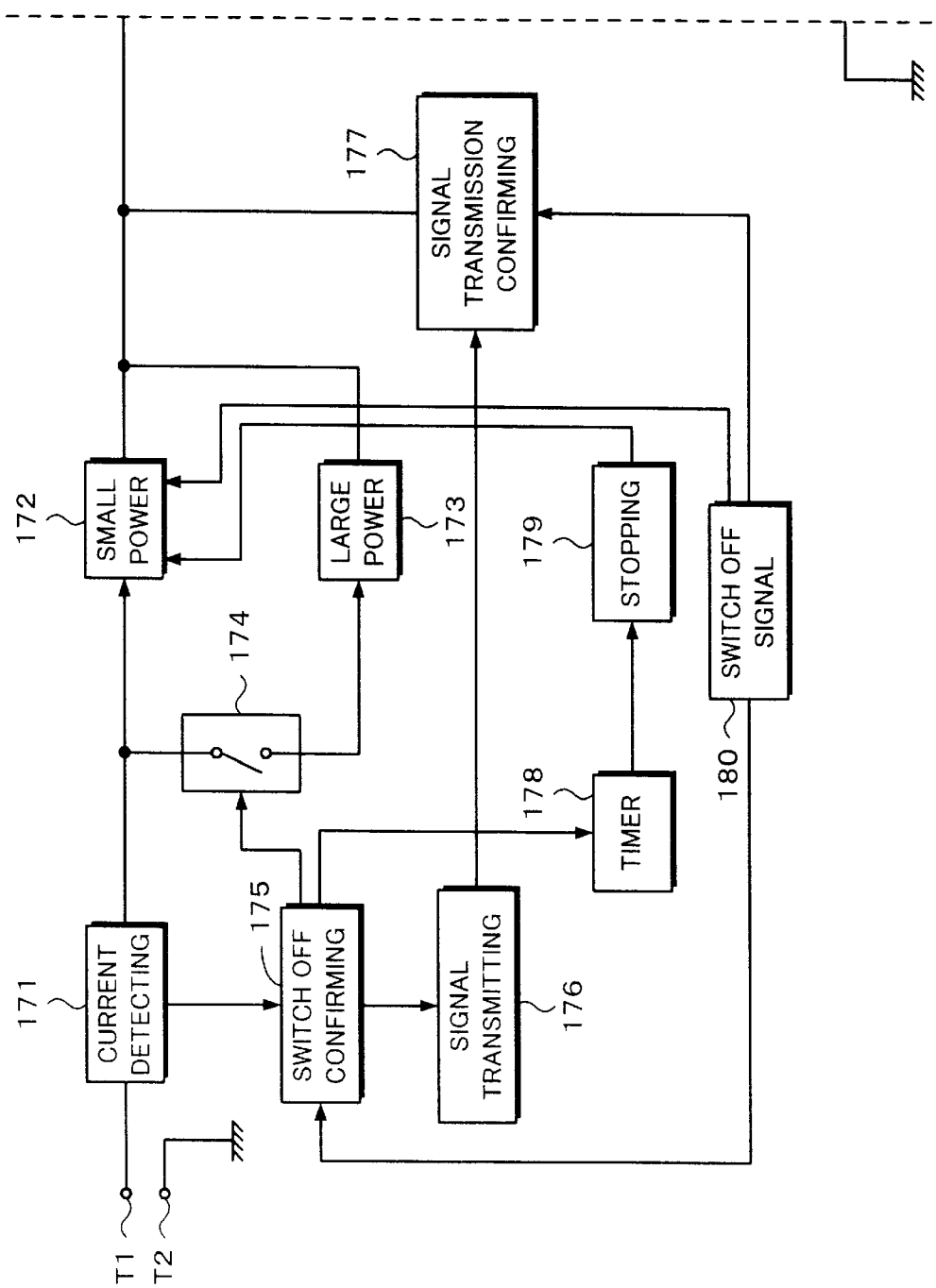

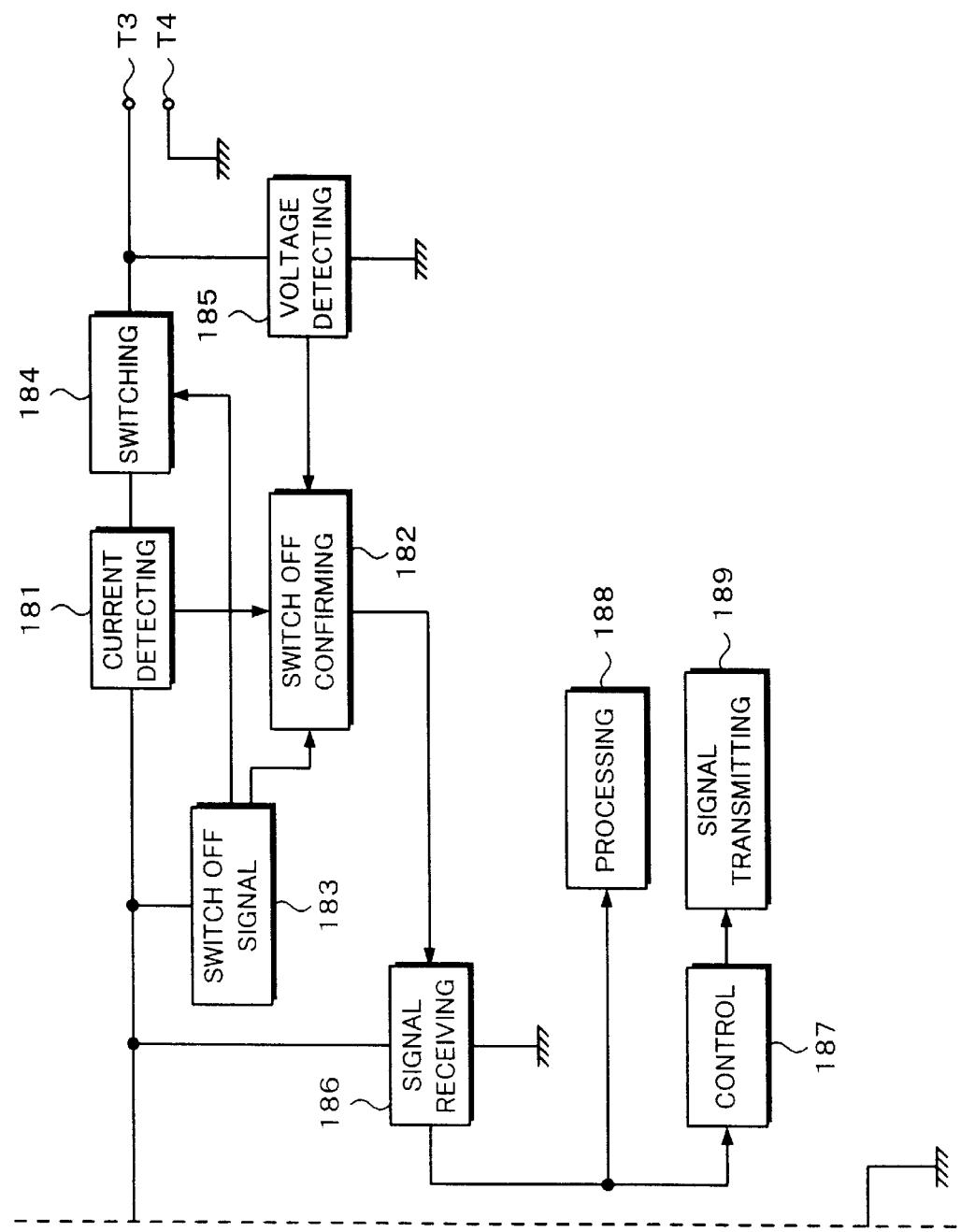

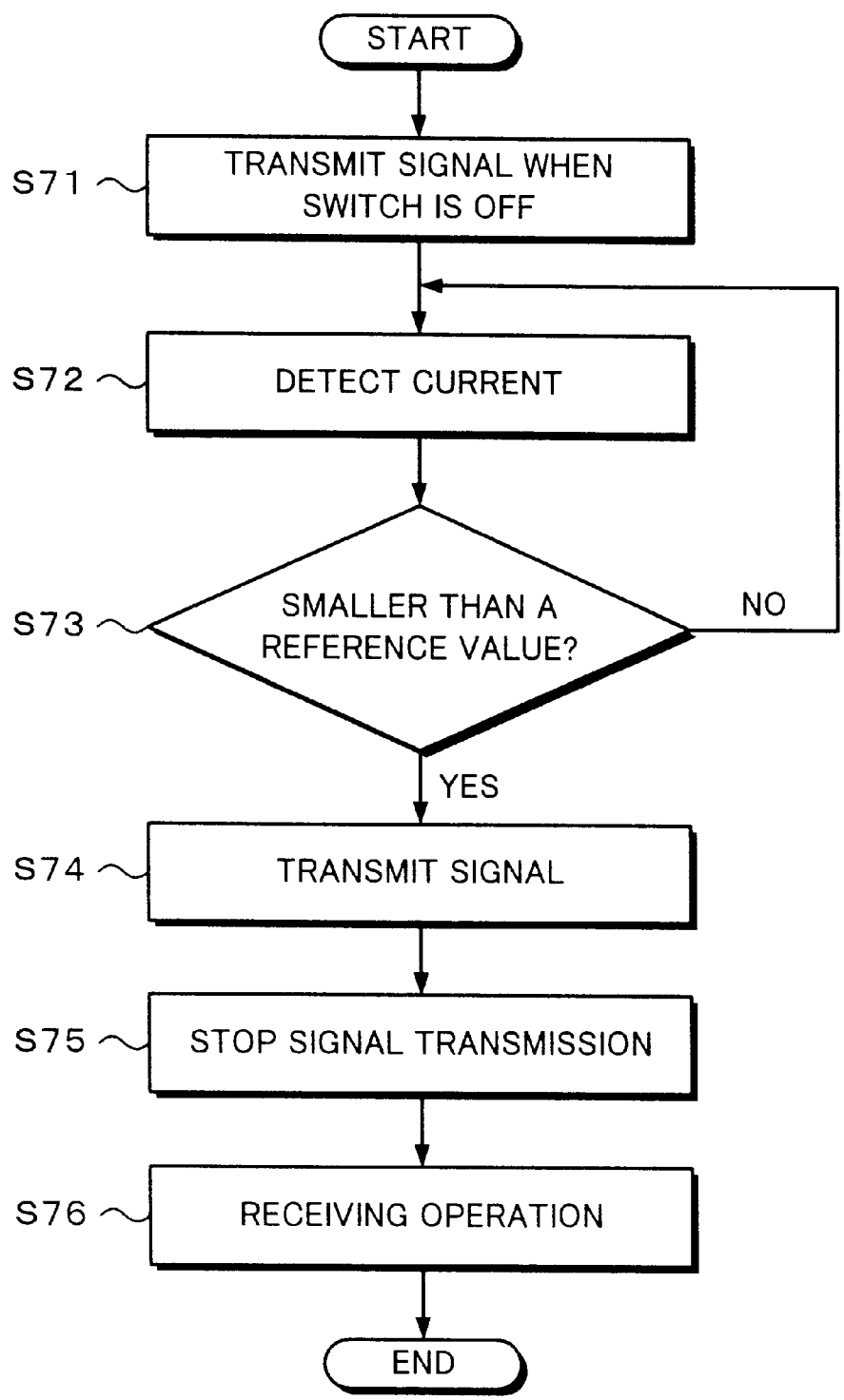

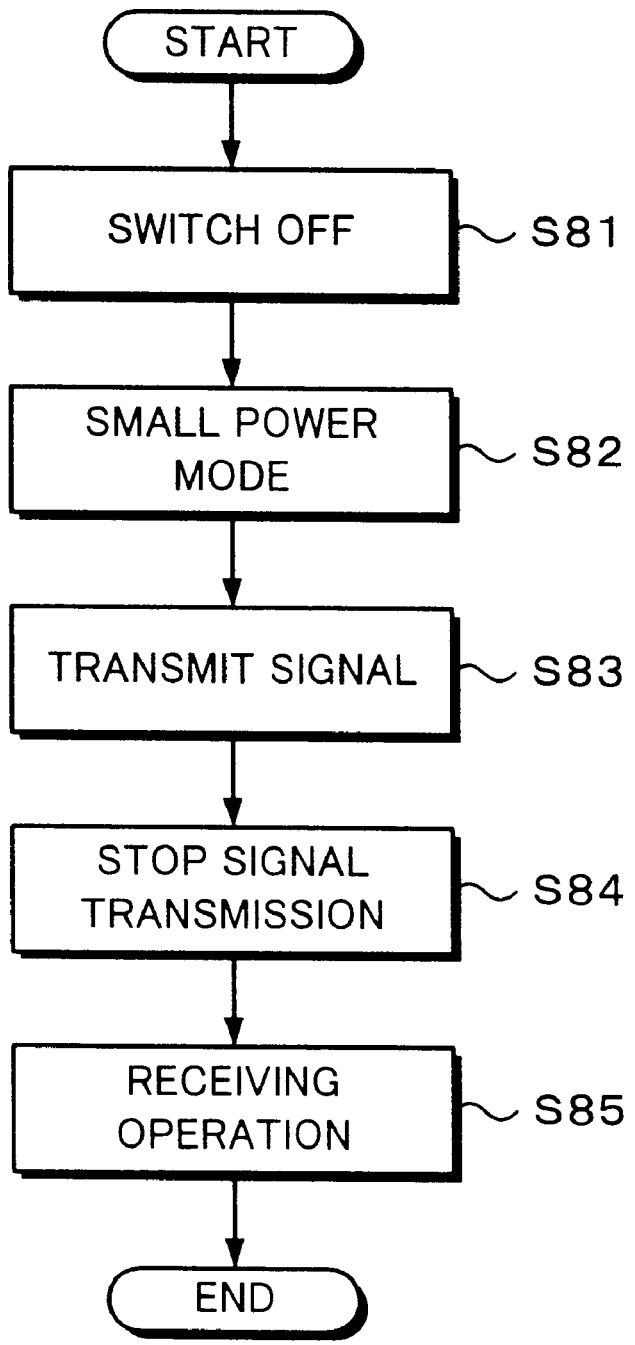

POWER SUPPLYING ADAPTER, ELECTRONIC EQUIPMENT, AND SIGNAL TRANSMISSION SYSTEM

BACKGROUND OF THE INVENTION

1. Field of the Invention

The invention relates to a power supplying adapter, electronic equipment, and a signal transmission system which can transmit a signal by connecting, particularly, a power supplying adapter and electronic equipment by two terminals of a (+) terminal and a (−) terminal.

2. Description of the Related Art

As a secondary battery of electronic equipment, attention is paid to a lithium ion battery. The lithium ion battery has advantages such that a duration can be extended and there is hardly a memory effect as compared with the conventional secondary battery. In case of charging the lithium ion battery, by transmitting and receiving a signal between a power supplying adapter (hereinafter, referred to as an AC adapter) and a microcomputer of the electronic equipment, whether the AC adapter connected to the electronic equipment is an AC adapter with a correct correspondence relation with the electronic equipment or not is discriminated. This is because if a voltage or a current exceeding a rated voltage/current of the secondary battery, for example, 4.2V/0.5A is supplied, if the secondary battery is charged by 6V/1A, there is a fear such that the secondary battery is broken.

To prevent such a situation, therefore, as shown in FIG. 1A, an AC adapter 291 having an outlet that can be connected to a commercially available power source and a set 292 of electronic equipment needs to be connected by three terminals comprising a + terminal, a − terminal, and a signal terminal.

There are, however, problems such that the costs rise because one signal terminal is provided between the AC adapter 291 and set 292 besides the two terminals of the + terminal and the − terminal which are necessary for power supply and a size increases by adding a protecting circuit to prevent a heat from being generated from a charger and the charger from being broken. There is also a problem of an erroneous operation due to noises which are generated in the signal terminal.

In case of connecting the AC adapter 291 and set 292 by two terminals, there is a method of using a filter as shown in FIG. 1B.

In case of using the filter, however, there are drawbacks such that the filter is expensive and is large and there are, consequently, problems such that noises or the like are generated, it is necessary to use a specific frequency, and the like.

OBJECTS AND SUMMARY OF THE INVENTION

It is, therefore, an object of the invention to provide a power supplying adapter, electronic equipment, and a signal transmission system, in which even if the AC adapter and the electronic equipment are connected by using two terminals of a + terminal and a − terminal, a communication can be performed.

According to the invention of one embodiment, there is provided a power supplying adapter which can be connected to electronic equipment by two terminals, comprising: a power supplying unit in which a small power mode to output a small electric power and a large power mode to output a large electric power can be switched; current detecting means for detecting a current which is outputted from the power supplying unit; signal receiving means for receiving a signal which is transmitted from the electronic equipment; and control means for making the power supplying unit operative in the small power mode and making the signal receiving means operative when the current detected by the current detecting means is equal to or smaller than a reference value.

According to the invention of another embodiment, there is provided a power supplying adapter which can be connected to electronic equipment by two terminals, comprising: a power supplying unit in which a small power mode to output a small electric power and a large power mode to output a large electric power can be switched; current detecting means for detecting a current which is outputted from the power supplying unit; signal transmitting means for transmitting a signal to the electronic equipment; and control means for making the power supplying unit operative in the small power mode and making the signal transmitting means operative when the current detected by the current detecting means is equal to or smaller than a reference value.

According to the invention of another embodiment, there is provided electronic equipment which can be connected to a power supplying adapter by two terminals, comprising: signal receiving means for receiving a signal which is transmitted from the power supplying adapter; control means for controlling on the basis of the signal received by the signal receiving means; and switching means for disconnecting a power source which is supplied from the power supplying adapter.

According to the invention of another embodiment, there is provided electronic equipment which can be connected to a power supplying adapter by two terminals, comprising: signal transmitting means for transmitting a signal to the power supplying adapter; control means for controlling the signal transmitting means; and switching means for disconnecting a power source which is supplied from the power supplying adapter.

According to the invention of another embodiment, there is provided a signal transmission system which has a power supplying adapter that is connected to an AC power source and generates a predetermined DC power source voltage and in which the power supplying adapter and electronic equipment are connected by two terminals, wherein the power supplying adapter comprises: a power supplying unit in which a small power mode to output a small electric power and a large power mode to output a large electric power can be switched; current detecting means for detecting a current which is outputted from the power supplying unit; first signal receiving means for receiving a signal which is transmitted from the electronic equipment; and first control means for making the power supplying unit operative in the small power mode and making the first signal receiving means operative when the current detected by the current detecting means is equal to or smaller than a reference value, and the electronic equipment comprises: second signal transmitting means for transmitting a signal to the power supplying adapter; second control means for controlling the second signal transmitting means; and switching means for disconnecting a power source which is supplied from the power supplying adapter.

According to the invention of another embodiment, there is provided a signal transmission system which has a power supplying adapter that is connected to an AC power source and generates a predetermined DC power source voltage and in which the power supplying adapter and electronic equipment are connected by two terminals, wherein the power supplying adapter comprises: a power supplying unit in which a small power mode to output a small electric power and a large power mode to output a large electric power can be switched; current detecting means for detecting a current which is outputted from the power supplying unit; first signal transmitting means for transmitting a signal to the electronic equipment; and first control means for making the power supplying unit operative in the small power mode and making the first signal transmitting means operative when the current detected by the current detecting means is equal to or smaller than a reference value, and the electronic equipment comprises: second signal receiving means for receiving a signal which is transmitted from the power supplying adapter; second control means for controlling on the basis of the signal received by the second signal receiving means; and switching means for disconnecting a power source which is supplied from the power supplying adapter.

As mentioned above, even when the AC adapter and the set are connected by the two terminals of the + terminal and the − terminal, the signal can be transmitted and received. By transmitting a signal indicative of a current mode of the AC adapter from the AC adapter, the set which receives such a signal controls the mode so as to be adapted to the mode of the AC adapter. By transmitting a signal indicative of the current mode of the set from the set, the AC adapter which receives such a signal generates a voltage/current so as to be adapted to the mode of the set.

The above and other objects and features of the present invention will become apparent from the following detailed description and the appended claims with reference to the accompanying drawings.

BRIEF DESCRIPTION OF THE DRAWINGS

FIGS. 13A and 13B are block diagrams showing the third embodiment to which the invention is applied;

FIGS. 14A and 14B are block diagrams showing the fourth embodiment to which the invention is applied;

FIG. 17 is a circuit diagram for use in explanation of a signal transmitting circuit to which the invention is applied;

FIGS. 19A and 19B are block diagrams showing the fifth embodiment to which the invention is applied;

FIG. 26 is a flowchart showing an embodiment of processes of the AC adapter to which the invention is applied;

FIG. 27 is a flowchart showing an embodiment of processes on the set side to which the invention is applied;

DETAILED DESCRIPTION OF THE PREFERRED EMBODIMENTS

Figure 1A:
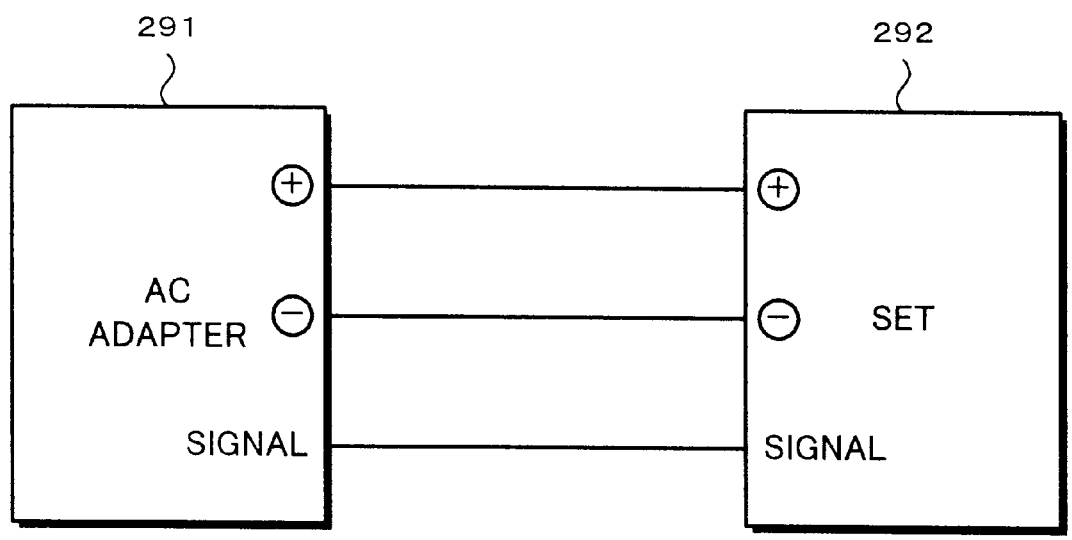
FIGS. 1A and 1B are schematic diagrams showing conventional systems of an AC adapter and a set.
Figure 1B:
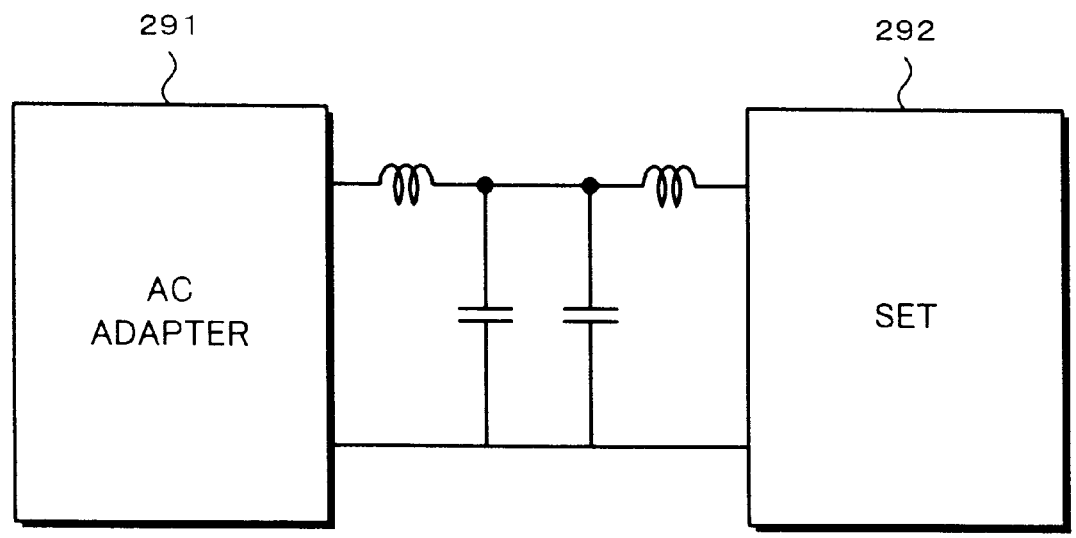
Figure 2:
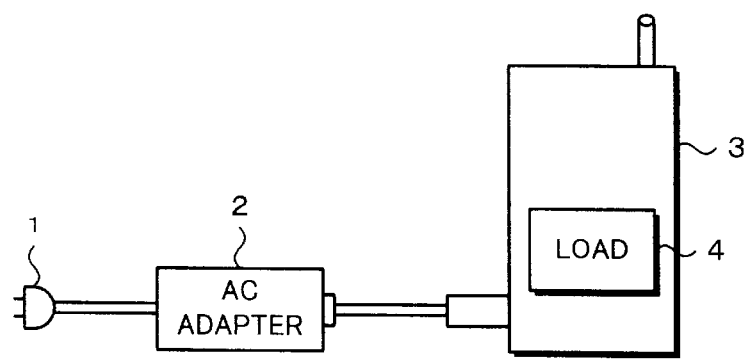
FIG. 2 shows a schematic construction of an embodiment to which the invention is applied.

An embodiment of the invention will now be described hereinbelow with reference to the drawings. FIG. 2 shows a schematic construction of the embodiment to which the invention is applied. An AC adapter 2 connected to an outlet 1 to which a commercially available power source can be connected and a set 3 are connected. In FIG. 2, a cellular phone is used as an example of the set 3. A load circuit 4 is included in the set 3. A secondary battery is included in the load circuit 4.

Figure 3:
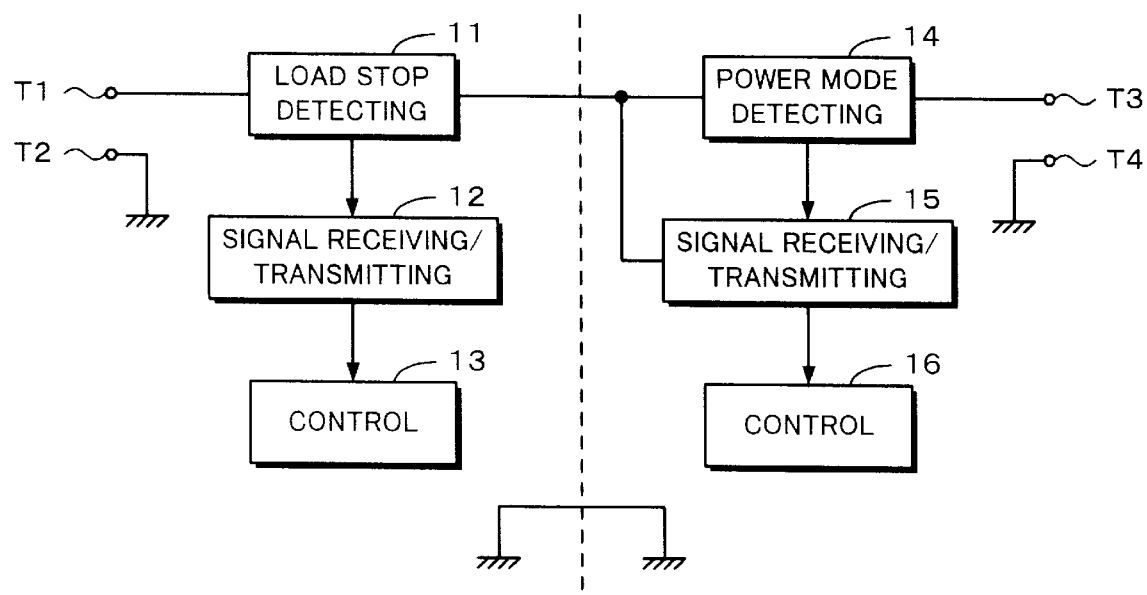
FIG. 3 is a schematic block diagram for explaining a fundamental communicating method of the invention.

To make an explanation easy, a fundamental communicating method of the invention will now be described with reference to FIG. 3. FIG. 3 is a schematic diagram of an example of an output stage of the AC adapter 2 and an input stage of the set 3. The output stage of the AC adapter 2 is constructed by a load stop detecting circuit 11, a signal receiving/transmitting circuit 12, and a control circuit 13. The input stage of the load circuit 4 is made up of a power mode detecting circuit 14, a signal receiving/transmitting circuit 15, and a control circuit 16.

A DC voltage/current formed from the commercially available power source is supplied through input terminals T1 and T2. The load stop detecting circuit 11 detects whether a load, namely, the set 3 has been connected or not. The signal receiving/transmitting circuit 12 receives a signal from the set 3 through the load stop detecting circuit 11, or transmits a signal to the set 3 through the load stop detecting circuit 11. The control circuit 13 controls the AC adapter 2 in accordance with a received signal or a transmitted signal.

A voltage/current is supplied to the load circuit 4 through output terminals T3 and T4. The power mode detecting circuit 14 detects whether the power supply from the AC adapter 2 has been stopped or not or whether the voltage/current has changed or not. The signal receiving/transmitting circuit 15 receives a signal from the AC adapter 2 or transmits a signal to the AC adapter 2. The control circuit 16 controls the set 3 in accordance with the received signal or the transmitted signal.

The operation at this time will now be described. First, the set 3 temporarily disconnects the load. The AC adapter 2 detects that the load of the set 3 has been stopped. By this detection, the AC adapter 2 is switched to a mode in which the signal can be received or transmitted (small power mode). The AC adapter 2 and set 3 communicate the signal.

After the power source was supplied, the AC adapter 2 temporarily stops the power supply. The set 3 detects that the power supply has been stopped. The set 3 stops the load and is switched to a mode in which the signal can be received or transmitted (small power mode). The AC adapter 2 and set 3 communicate the signal.

The direction to transmit the signal can be known by temporarily stopping the load of the set from the AC adapter 2 and by temporarily stopping the power supply. The signal is communicated by this operation.

Figure 4:
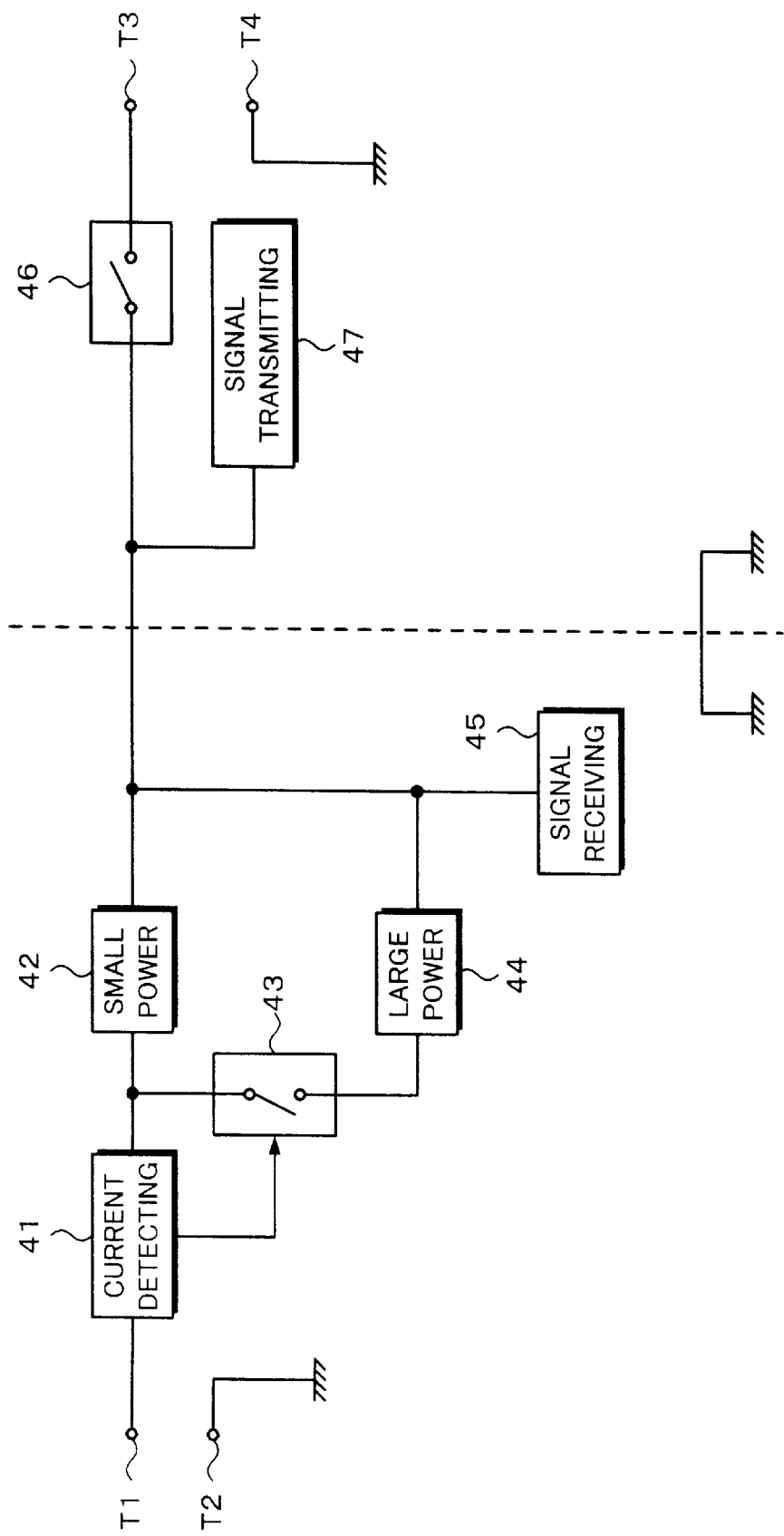
FIG. 4 is a schematic block diagram of the first example to which the invention is applied.

A few examples of signal transmission systems to which the invention is applied will now be described. FIG. 4 shows a schematic block diagram of the first example. The AC adapter 2 is operated by a large power circuit 44 since a switching circuit 43 is ON. In this instance, when a current detecting circuit 41 detects an OFF state of a switching circuit 46 of the set 3, the switching circuit 43 is turned off and the AC adapter 2 is operated by only a small power circuit 42. When the AC adapter 2 is operated by only the small power circuit 42, a signal is transmitted from a signal transmitting circuit 47 of the set 3. This signal is received by a signal receiving circuit 45. The AC adapter 2 is controlled in accordance with the received signal.

Figure 5:
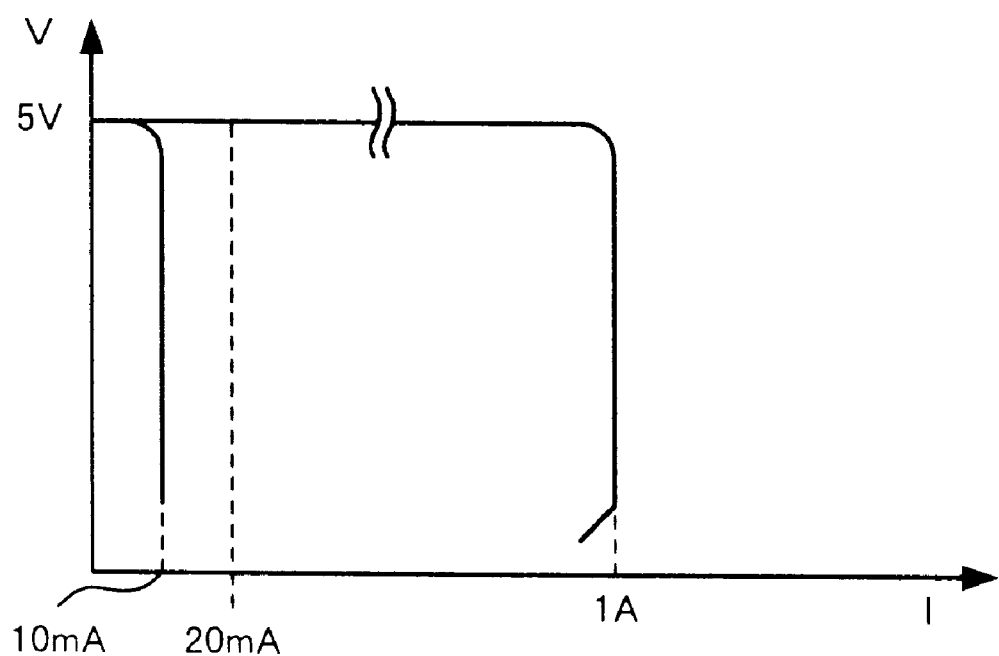
FIG. 5 shows voltage/current characteristics of an example which is applied to the invention.

As shown in FIG. 5, the large power circuit 44 outputs a voltage/current of 5V/1A as an example. The small power circuit 42 outputs a voltage/current of 5V/10 mA as an electric power smaller than an electric power of the large power circuit 44. When the current which is detected by the current detecting circuit 41 is equal to or smaller than 20 mA, it is determined that the switching circuit 43, is OFF or is in a state near a non-load. The switching circuit 43 is turned off, thereby allowing the AC adapter to operate by only the small power circuit 42. A signal is transmitted from the signal transmitting circuit 47 and is received by the signal receiving circuit 45.

Figure 6:
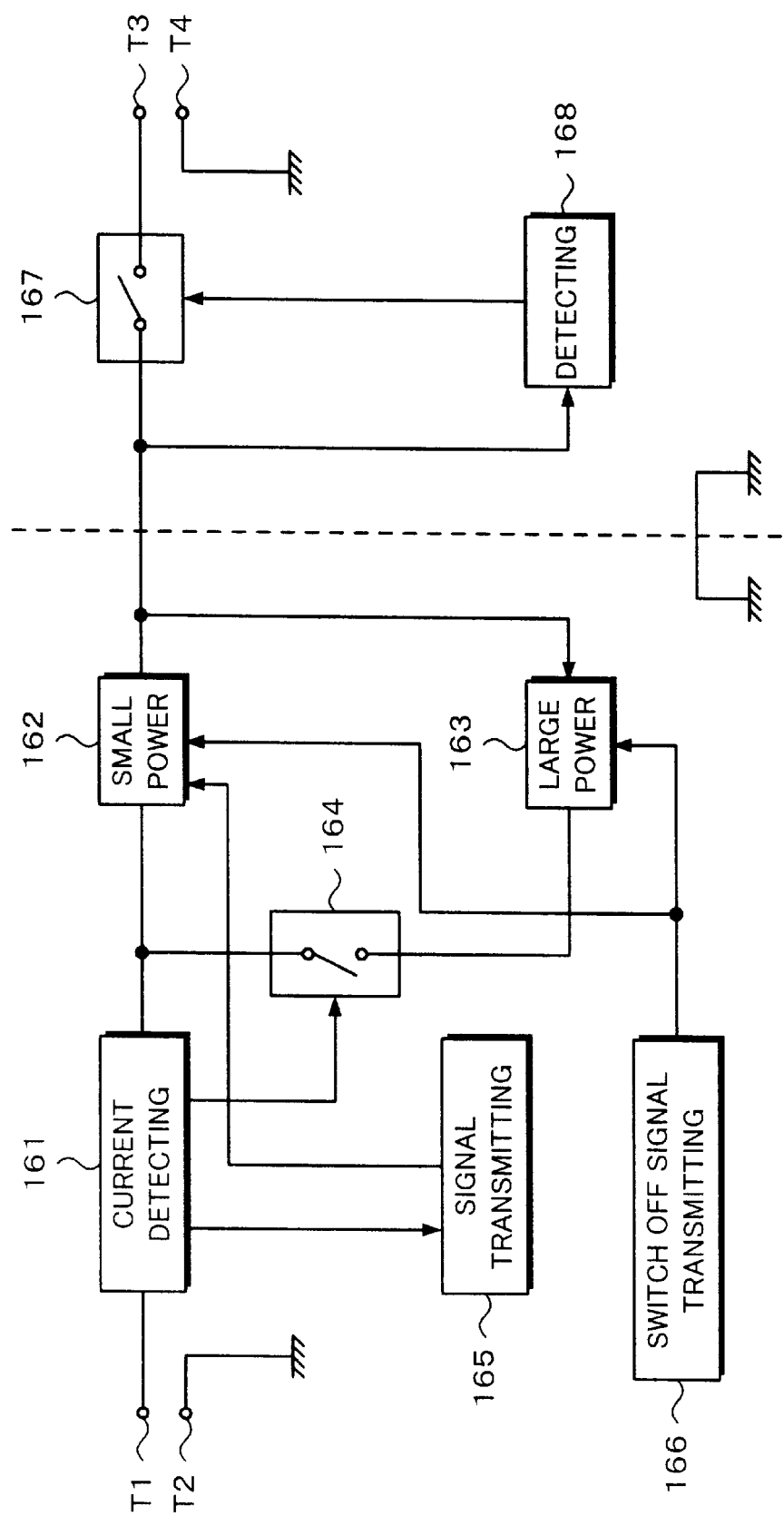
FIG. 6 is a schematic block diagram of the second example to which the invention is applied.

FIG. 6 shows a schematic block diagram of the second example of the signal transmission system to which the invention is applied. A switching circuit 164 is ON and the AC adapter 2 is operated by a large power circuit 163. A signal to turn off a switching circuit 167 of the set 3 is transmitted from each of a small power circuit 162 and the large power circuit 163 which are controlled by a switch OFF signal transmitting circuit 166. This signal is detected by a detecting circuit 168 and the switching circuit 167 is turned off. In the AC adapter 2, a current detecting circuit 161 detects that the switching circuit 167 has been turned off, and the switching circuit 164 is turned off by the current detecting circuit 161. That is, the AC adapter is operated by only the small power circuit 162. When the current detecting circuit 161 detects that the switching circuit 167 has been turned off, a signal is transmitted to the set 3 from the small power circuit 162 controlled by a signal transmitting circuit 165.

Figure 7:
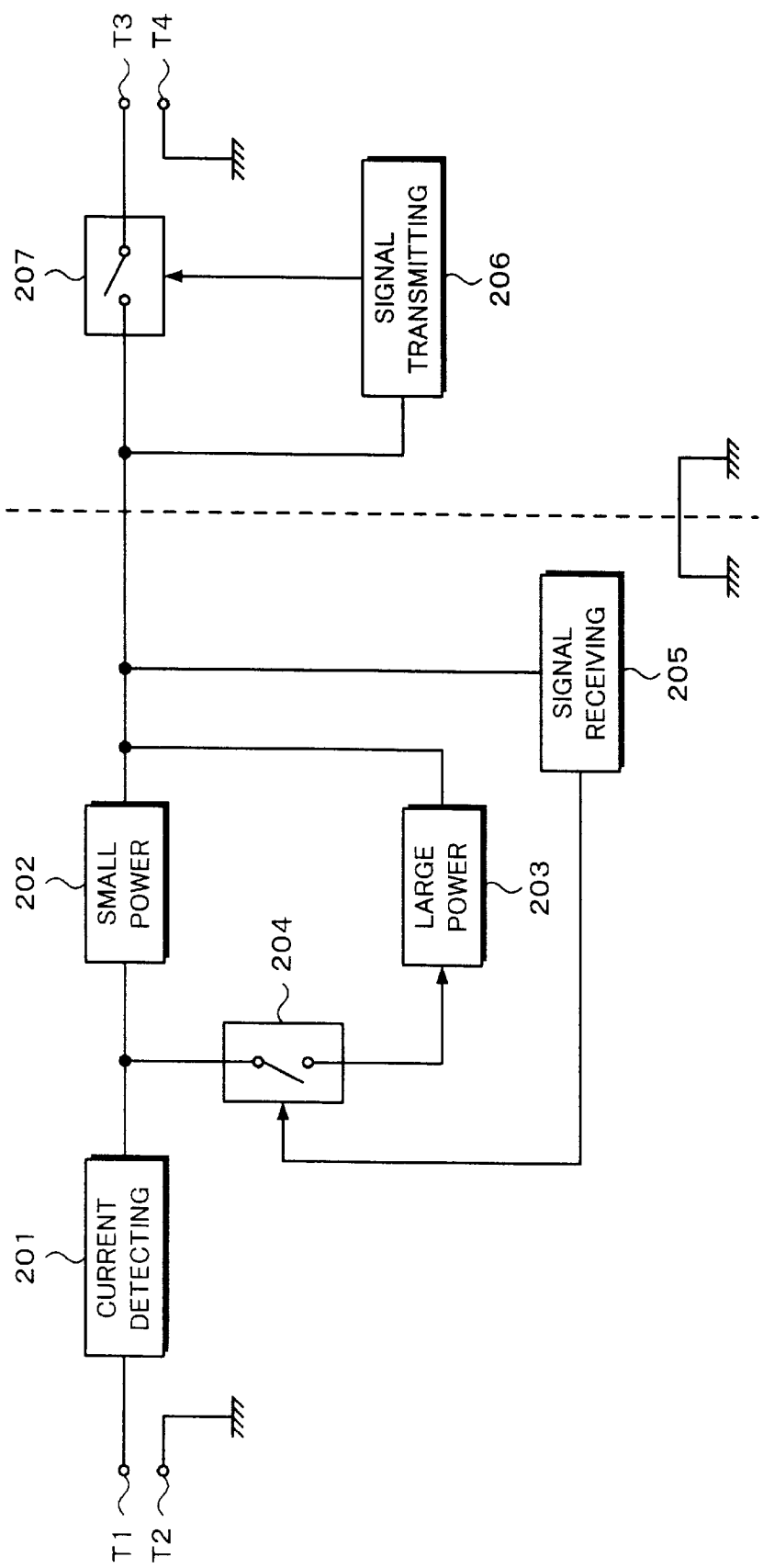
FIG. 7 is a schematic block diagram of the third example to which the invention is applied.

FIG. 7 shows a schematic block diagram of the third example of the signal transmission system to which the invention is applied. The AC adapter 2 is operated by a small power circuit 202 and transmits a switch OFF signal. A current detecting circuit 201 detects an OFF state of a switching circuit 207 of the set 3. By controlling so as to repeat the ON/OFF operations of the switching circuit 207 from this state, a signal transmitting circuit 206 of the set 3 transmits a signal. When a signal receiving circuit 205 receives such a signal, a switching circuit 204 is switched from the OFF state to the ON state. That is, the AC adapter 2 is switched from the small power mode to the large power mode by the signal from the set 3.

Figure 8:
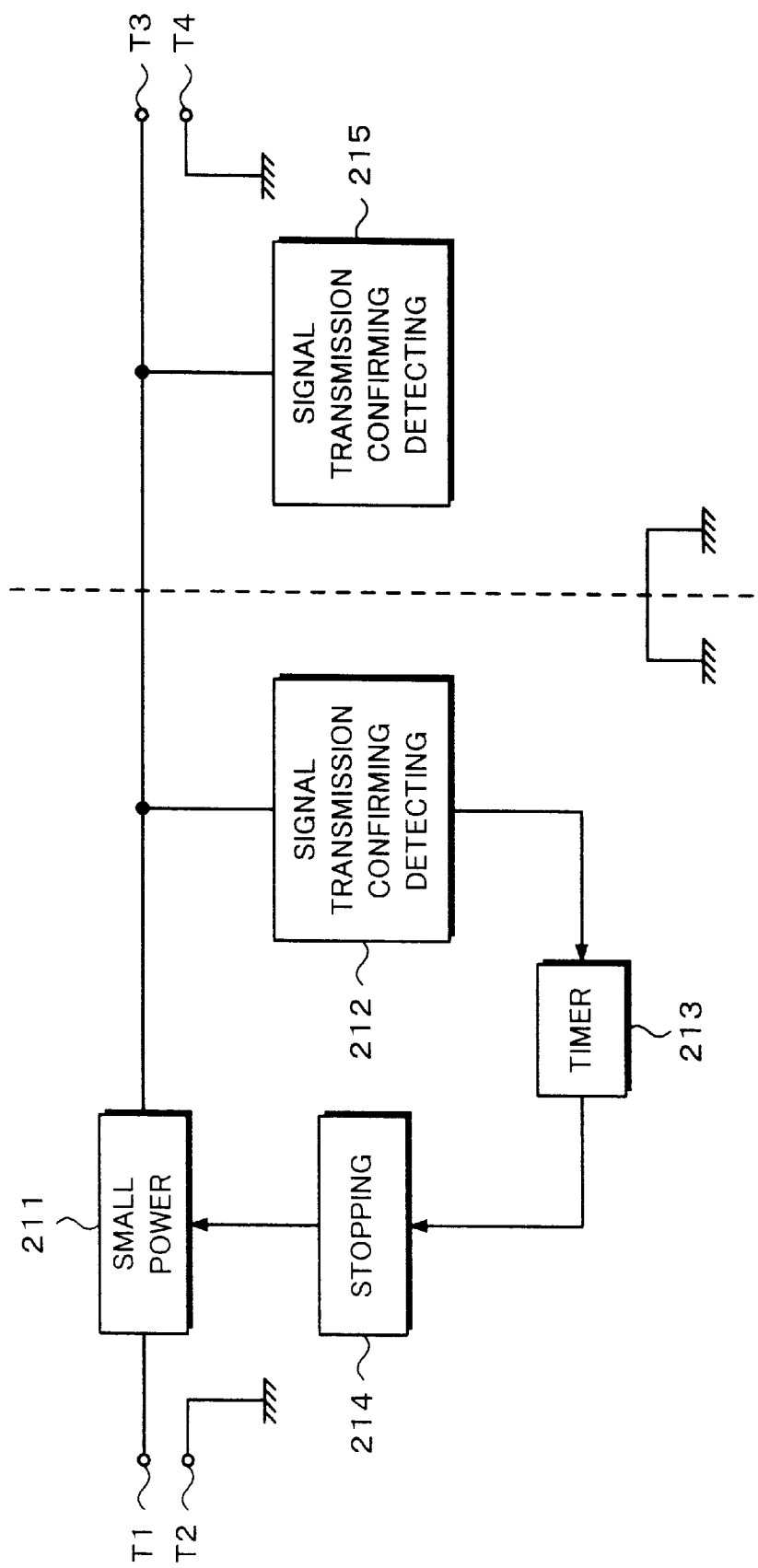
FIG. 8 is a schematic block diagram of the fourth example to which the invention is applied.

FIG. 8 shows a schematic block diagram of the fourth example of the signal transmission system to which the invention is applied. The AC adapter 2 is operated by a small power circuit 211 and a signal is transmitted from the AC adapter 2. In this instance, a signal transmission confirming detecting circuit 212 discriminates whether the transmitted signal has accurately been transmitted or not. If it is decided that there is no signal, after the elapse of a predetermined time At of a timer circuit 213, the circuit is controlled by a stopping circuit 214 and the operation of the small power circuit 211 is stopped. At this time, even in the set 3, whether the signal has been transmitted or not is detected by a signal transmission confirming detecting circuit 215.

Figure 9:
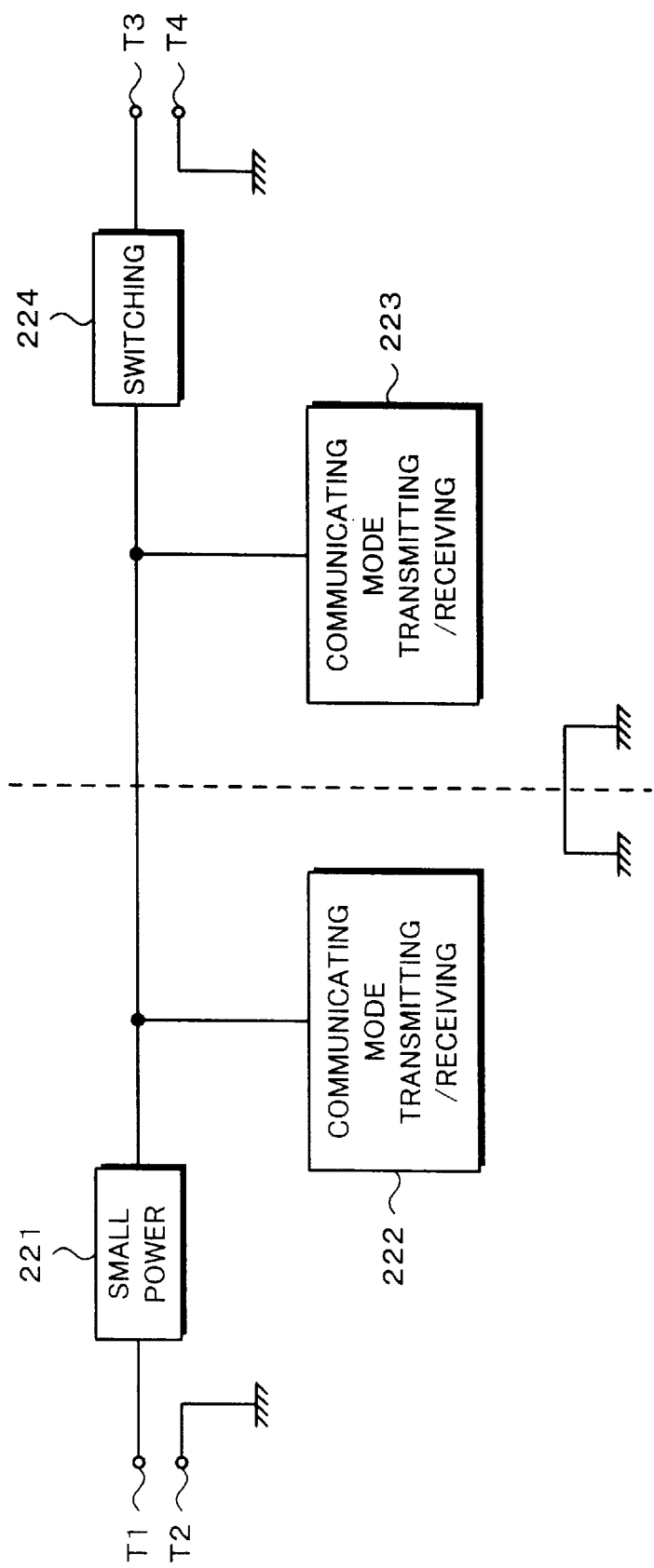
FIG. 9 is a schematic block diagram of the fifth example to which the invention is applied.
Figure 10:
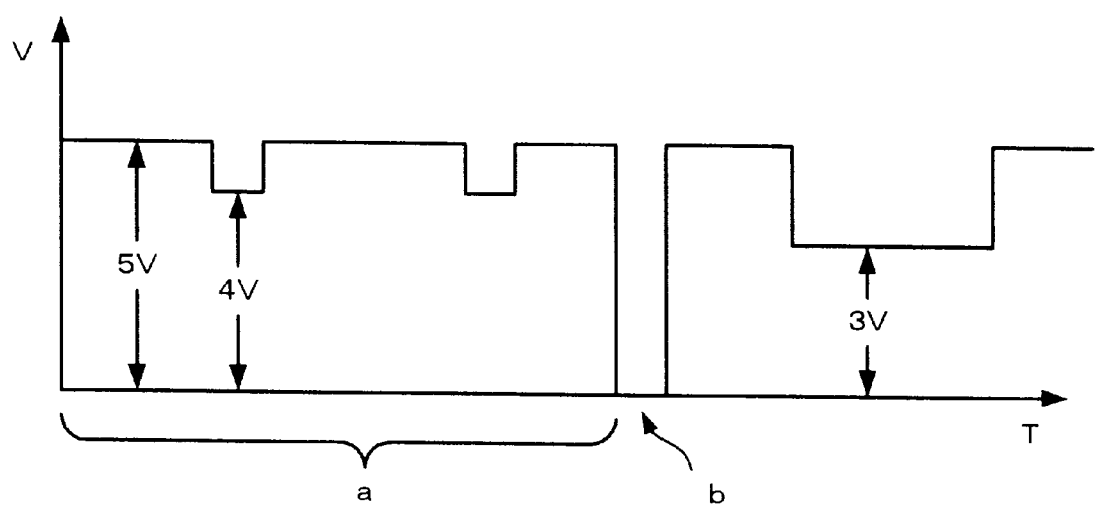
FIG. 10 is a schematic diagram of an example of a communication which is applied to the invention.

FIG. 9 shows a schematic block diagram of the fifth example of the signal transmission system to which the invention is applied. In the fifth embodiment, one of the AC adapter 2 and set 3 is in a state where the signal is transmitted and the other is in a state where the signal is received. At this time, the AC adapter or the set which has first transmitted the signal has a priority of the signal transmission. However, by transmitting the signal by one of the AC adapter and the set which does not have the priority, the AC adapter or set which transmitted the signal can have the priority. Specifically speaking, the AC adapter is operated by a small power circuit 221 and a signal is transmitted by a communicating mode transmitting/receiving circuit 222 as shown in (a) in FIG. 10. When the AC adapter 2 has the priority, if the signal is transmitted as shown in (b) in FIG. 10 from the set 3 by the ON/OFF operations of a switching circuit 224, the priority is transferred to the set 3. The signal is transmitted from a communicating mode transmitting/receiving circuit 223 to the AC adapter 2.

Figure 11:
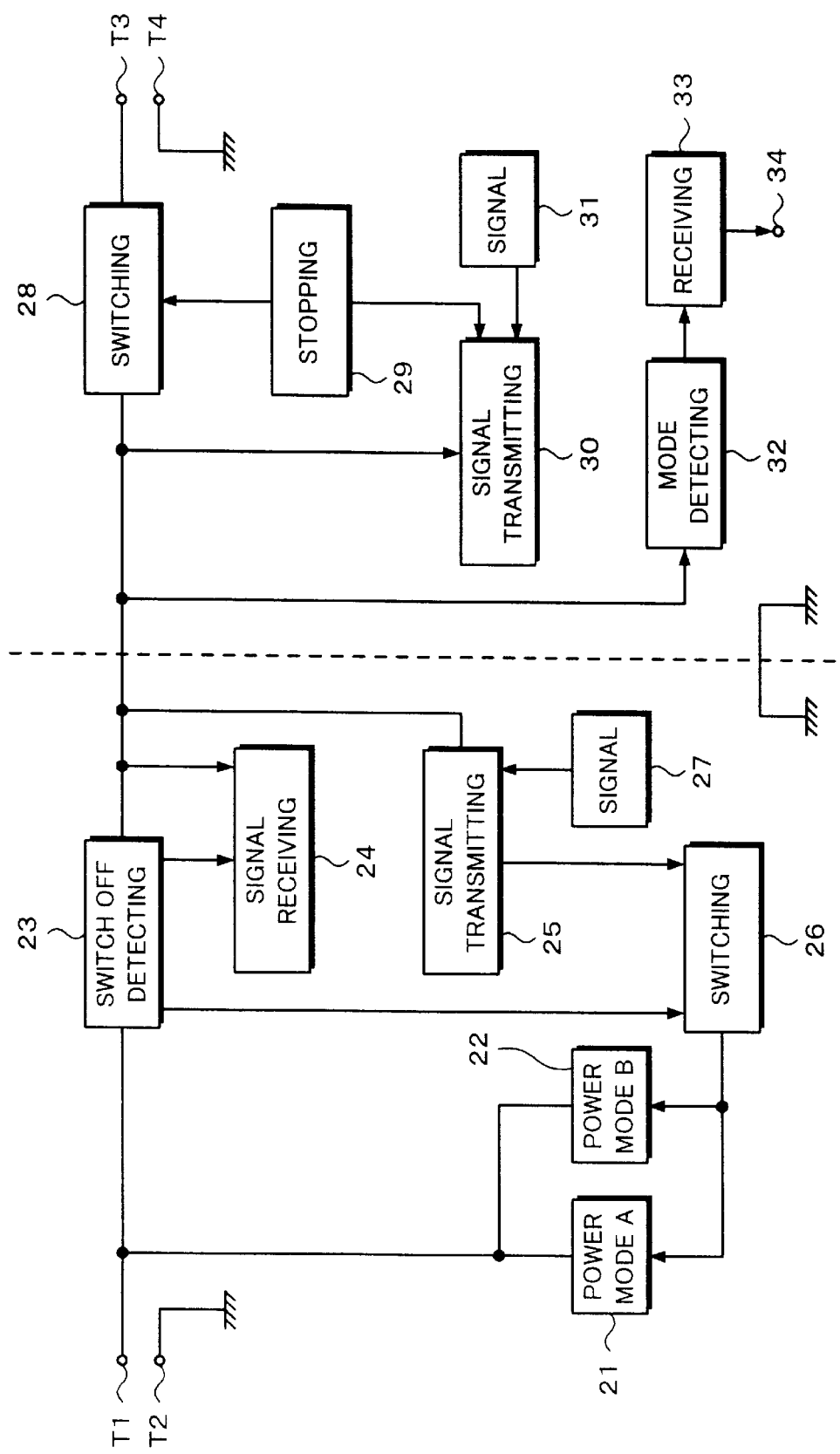
FIG. 11 is a block diagram showing the first embodiment to which the invention is applied.

The first embodiment corresponding to the fundamental communicating method of the invention shown in FIG. 3 mentioned above is shown in FIG. 11. In the AC adapter 2, the voltage/current which is supplied to the set 3 is controlled by a power mode A circuit 21 and a power mode B circuit 22. A switch OFF detecting circuit 23 detects whether a switching circuit 28 of the set 3 has been turned off or not. A detection result is supplied to a signal receiving circuit 24 and a switching circuit 26. The signal receiving circuit 24 receives the detection result from the switch OFF detecting circuit 23 and the signal which is transmitted from the set 3. A signal transmitting circuit 25 supplies a signal to the set 3 and switching circuit 26 in response to a signal supplied from a signal portion 27. The switching circuit 26 performs a control to switch the power mode A circuit 21 and power mode B circuit 22 in accordance with the detection result from the switch OFF detecting circuit 23 and the signal from the signal transmitting circuit 25.

In the set 3, the signal transmitted from the AC adapter 2 is supplied to a mode detecting circuit 32. The mode detecting circuit 32 detects either one of a communicating mode and a power supplying mode from the transmitted signal and supplies a detection signal to a receiving circuit 33. The receiving circuit 33 transmits the supplied signal to a control unit through a terminal 34.

The set 3 operates in accordance with the mode detected by the mode detecting circuit 32. First, in case of the power supplying mode, the switching circuit 28 is turned on and the power source is supplied to the set side through the output terminals T3 and T4. In case of the communicating mode, an instruction which is outputted from a stopping circuit 29 is supplied to the switching circuit 28 and a signal transmitting circuit 30. In response to this instruction, the switching circuit 28 is turned off. The signal transmitting circuit 30 transmits a signal in accordance with the instruction from the stopping circuit 29 and a signal from a signal portion 31.

In the communicating mode, when a communication is performed from the set 3 to the AC adapter 2, the AC adapter 2 detects an OFF state of the switching circuit 28 of the set 3. When the OFF state of the switching circuit 28 is detected, the AC adapter 2 transmits a signal after switching the mode to the power supplying mode in which a communication can be performed.

In case of communicating from the AC adapter 2, a temporary stop or a voltage change of the set 3 and AC adapter 2 is detected. The switching circuit 28 is turned off and each of the AC adapter 2 and set 3 are switched to the communicating mode.

The second embodiment comprising the schematic construction of the first example of FIG. 4 mentioned above is shown in FIG. 12. In the AC adapter 2, a switching circuit 54 is turned on and a large power circuit 53 operates. In this instance, when a current detecting circuit 51 detects the OFF state of a switching circuit 64 of the set 3, the switching circuit 54 is turned off and the AC adapter 2 is operated by only a small power circuit 52. A detection result from the current detecting circuit 51 is also supplied to a receiving circuit 55. When it is decided by the supplied signal that the switching circuit 64 is in the OFF state, the receiving circuit 55 enters a receiving mode. When the signal from the set 3 is received, the receiving circuit 55 supplies a signal to a control circuit 56.

In the set 3, by controlling a stopping circuit 63 by a control circuit 62, the switching circuit 64 is turned off. After the turn-off of the switching circuit 64, the control circuit 62 controls a signal transmitting circuit 65, thereby controlling the ON/OFF operation of a switching circuit 66. By controlling the ON/OFF operation of the switching circuit 66, a load circuit 67 to supply a constant voltage/constant current is turned on/off, so that a signal is generated. The signal generated by the ON/OFF operation of the switching circuit 66 is received by a receiving circuit 61 and the received signal is supplied to the control circuit 62. The control circuit 62 controls the ON/OFF operation of the switching circuit 66 through the signal transmitting circuit 65 in response to the supplied signal. The control circuit 62 transmits a signal to stop the whole operation by confirming the presence or absence of the signal.

Figure 13B:
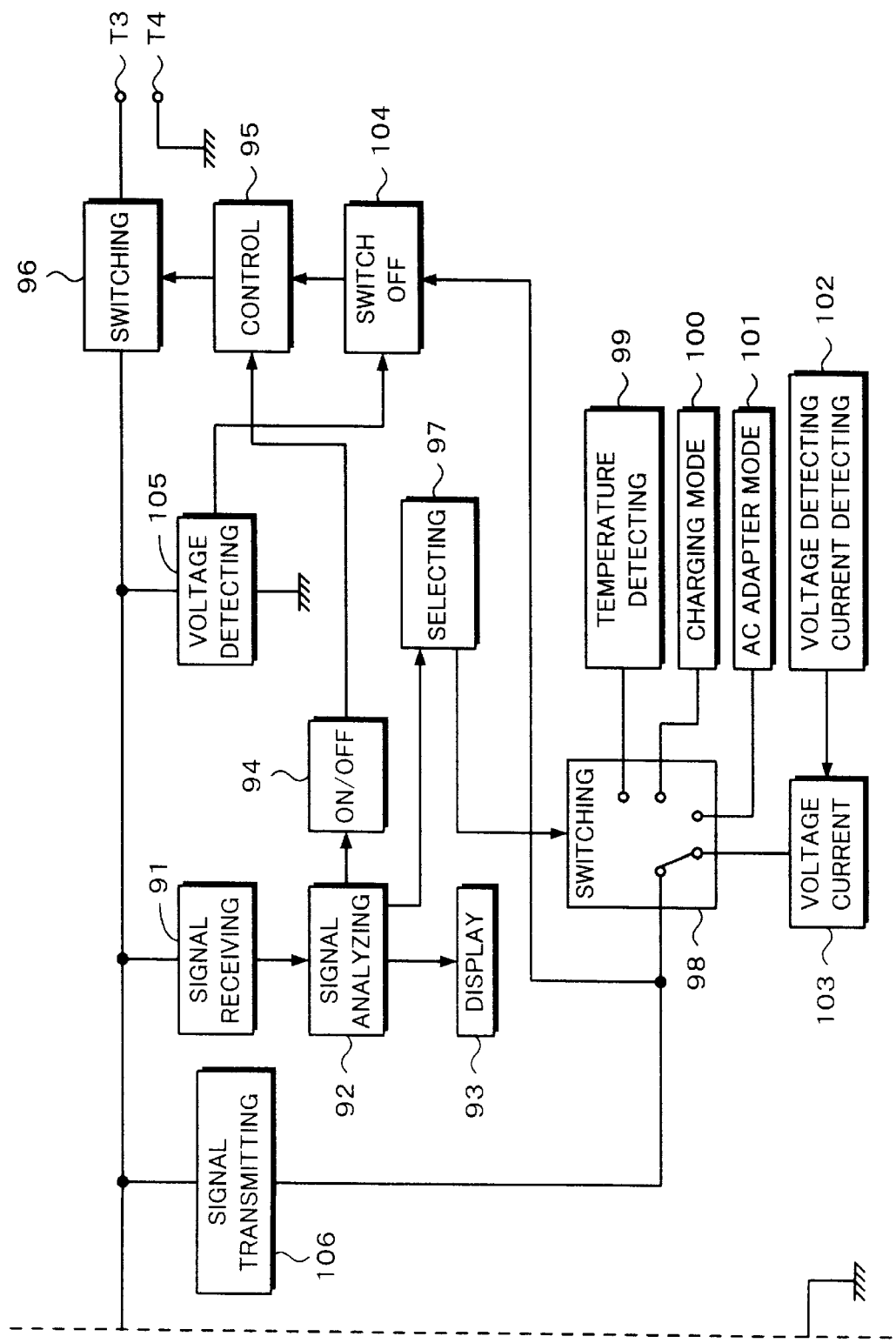

FIGS. 13A and 13B show the third embodiment with the schematic construction of the first example of FIG. 4 mentioned above. The AC adapter 2 is operated by a small power circuit 72 and/or a large power circuit 73. A detection result of a current detected by a current detecting circuit 71 connected to the input terminal T1 is supplied to a stopping circuit 74. In the AC adapter 2, the small power circuit 72 and large power circuit 73 are controlled and a voltage/current is outputted.

A receiving circuit 75 receives the signal which is transmitted from the set 3. The received signal is supplied to the stopping circuit 74 and a signal analyzing circuit 76. The stopping circuit 74 stops the operation of the large power circuit 73 on the basis of a detection result from the current detecting circuit 71 and the signal from the receiving circuit 75. The signal analyzing circuit 76 analyzes the supplied signal and transmits an analysis result to a switch control circuit 79 and a memory signal 77.

The switch control circuit 79 switches a switching circuit 80 on the basis of the supplied analysis result. Control signals are supplied to the switching circuit 80 from an AC adapter A mode 81, an AC adapter B mode 82, and a charging mode 83. A selected proper one of the control signals is supplied to the small power circuit 72 and large power circuit 73. The small power circuit 72 and large power circuit 73 operate in response to the supplied control signal.

A state of the charging mode is stored in a charging memory 84 connected to the charging mode 83. When the charging mode is stored, a signal is supplied to the memory signal 77. In the memory signal 77, a signal is generated on the basis of an analysis result from the signal analyzing circuit 76 and the signal from the charging memory 84. The generated signal is supplied to a signal transmitting circuit 78. The signal transmitting circuit 78 transmits a signal on the basis of the supplied signal.

A signal receiving circuit 91 receives the signal transmitted from the AC adapter 2. The received signal is analyzed by a signal analyzing circuit 92. An analysis result is supplied to a display portion 93, an ON/OFF circuit 94, and a selecting circuit 97. The display portion 93 displays an analysis result by, for example, a liquid crystal display, thereby informing the user of the present mode. Although the liquid crystal display has been used as an example of the display portion, the analysis result can be also informed by a voice sound.

In the selecting circuit 97, a signal to switch a switching circuit 98 is supplied to the switching circuit 98 on the basis of the supplied analysis result. In the switching circuit 98, the signal which was properly selected by the selecting circuit 97 is supplied to a switch OFF circuit 104 and a signal transmitting circuit 106. A temperature detecting circuit 99 detects a temperature of, for example, a secondary battery (not shown) and supplies a detection result to the signal transmitting circuit 106 through the switching circuit 98.

In a charging mode 100, a signal showing that the set 3 has been set to the charging mode is transmitted to the signal transmitting circuit 106 through the switching circuit 98. In an AC adapter mode 101, a signal showing that the set 3 has been set to the AC adapter mode is supplied to the signal transmitting circuit 106 through the switching circuit 98.

In a voltage detecting current detecting circuit 102, a voltage and a current are detected. The detected voltage and current are supplied to a voltage current circuit 103. In the voltage current circuit 103, a signal is supplied to the signal transmitting circuit 106 through the switching circuit 98 so as to raise the present voltage by only ΔV. Similarly, a signal is supplied from the voltage current circuit 103 to the signal transmitting circuit 106 through the switching circuit 98 so as to increase the present current by only ΔI. The signal transmitting circuit 106 transmits a signal according to the signal supplied through the switching circuit 98.

A voltage detecting circuit 105 detects the supplied voltage. A detection result is supplied to the switch OFF circuit 104. In the switch OFF circuit 104, a signal to turn off a switching circuit 96 is supplied to a control circuit 95 on the basis of the signal from the switching circuit 98 and a detection result from the voltage detecting circuit 105. The control circuit 95 supplies a control signal to control the switching circuit 96 to the switching circuit 96 on the basis of a signal from the ON/OFF circuit 94 and the signal from the switch OFF circuit. In the switching circuit 96, the ON/OFF operation of the switching circuit 96 is controlled in response to a control signal from the control circuit 95.

Figure 14B:
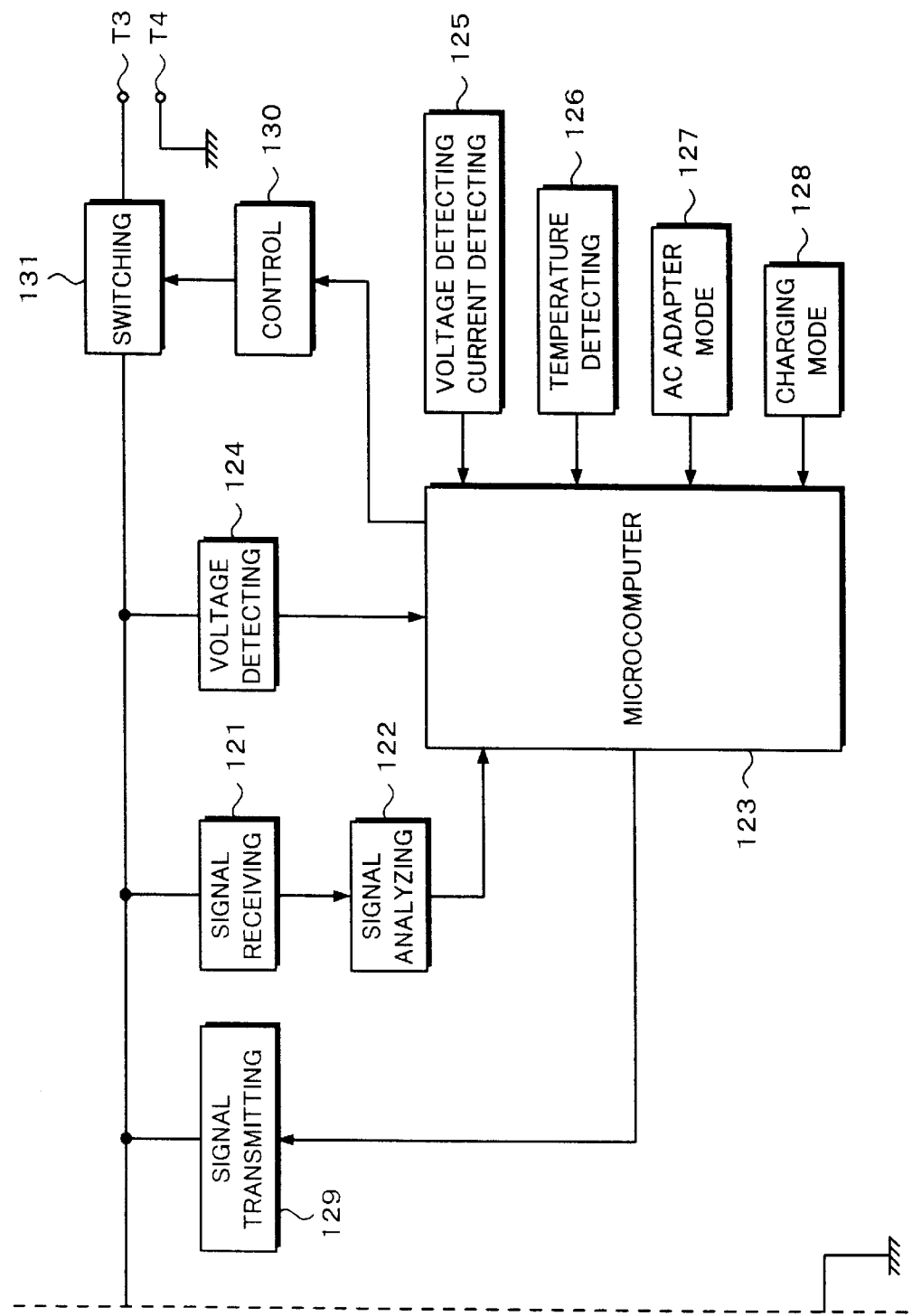

The fourth embodiment with the schematic construction of the first example of FIG. 4 mentioned above is shown in FIGS. 14A and 14B. In FIGS. 14A and 14B, a microcomputer is used in the control portion of the AC adapter 2 and set 3.

The AC adapter 2 is operated by a small power circuit 112 and/or a large power circuit 113. A detection result of a current detected by a current detecting circuit 111 connected to the input terminal T1 is supplied to a stopping circuit 114 and a microcomputer 116. A signal receiving circuit 115 receives the signal from the set 3 and supplies the received signal to the microcomputer 116. To control the AC adapter 2, the microcomputer 116 supplies control signals to the stopping circuit 114, an each-mode operating circuit 117, and a signal transmitting circuit 119 on the basis of the supplied detection result and signal. The stopping circuit 114 controls so as to stop the operation of the large power circuit 113 on the basis of the detection result of the current and the control signal from the microcomputer 116.

The each-mode operating circuit 117 supplies a signal to a control circuit 118 in order to make the AC adapter 2 operative in the mode according to the control signal from the microcomputer 116. The control circuit 118 controls the small power circuit 112 and large power circuit 113 in response to the signal. The signal transmitting circuit 119 transmits a signal in response to the control signal from the microcomputer 116.

In the set 3, a signal receiving circuit 121 receives the signal transmitted from the AC adapter 2 and transmits the received signal to a signal analyzing circuit 122. The signal analyzing circuit 122 analyzes the supplied signal and transmits an analysis result to a microcomputer 123. In a voltage detecting circuit 124, a detection result of the detected voltage is supplied to the microcomputer 123. A voltage detecting current detecting circuit 125 detects the present voltage and current. The detected voltage and current are supplied to the microcomputer 123.

A temperature detecting circuit 126 detects a temperature of, for example, a secondary battery (not shown). The detected temperature is supplied to the microcomputer 123. In an AC adapter mode 127, when the set 3 is at present in the AC adapter mode in which the voltage/current is supplied from the AC adapter 2, a signal indicative of such a fact is supplied to the microcomputer 123. In a charging mode 128, when the set 3 is at present in the charging mode to charge the secondary battery, a signal indicative of such a fact is supplied to the microcomputer 123.

The microcomputer 123 supplies control signals to a signal transmitting circuit 129 and a control circuit 130 on the basis of the supplied signal. The signal transmitting circuit 129 transmits a signal in response to the control signal from the microcomputer 123. The control circuit 130 outputs a signal to control the ON/OFF operation of a switching circuit 131 in response to the control signal from the microcomputer 123.

Figure 12:
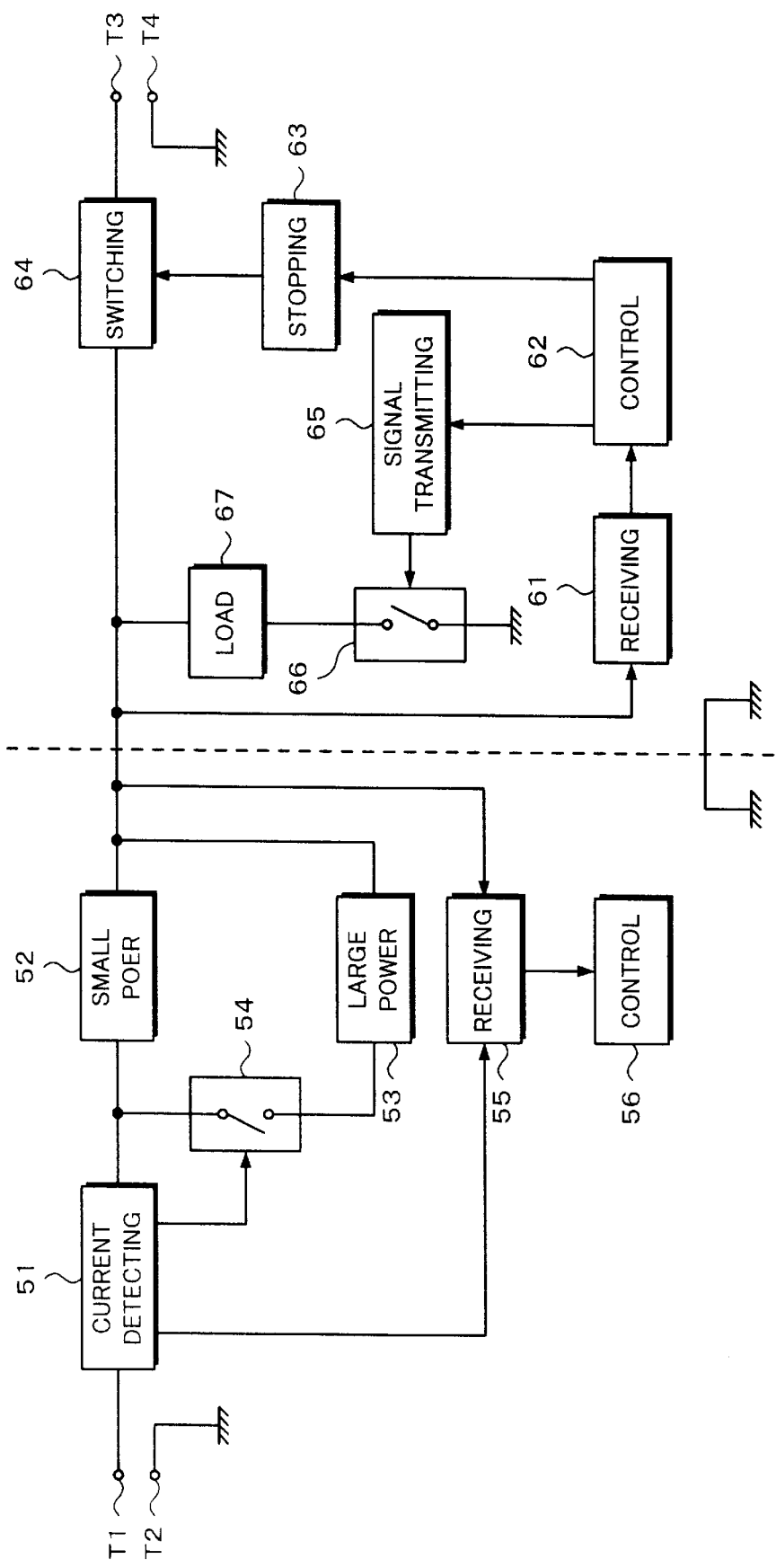
FIG. 12 is a block diagram showing the second embodiment to which the invention is applied.
Figure 15:
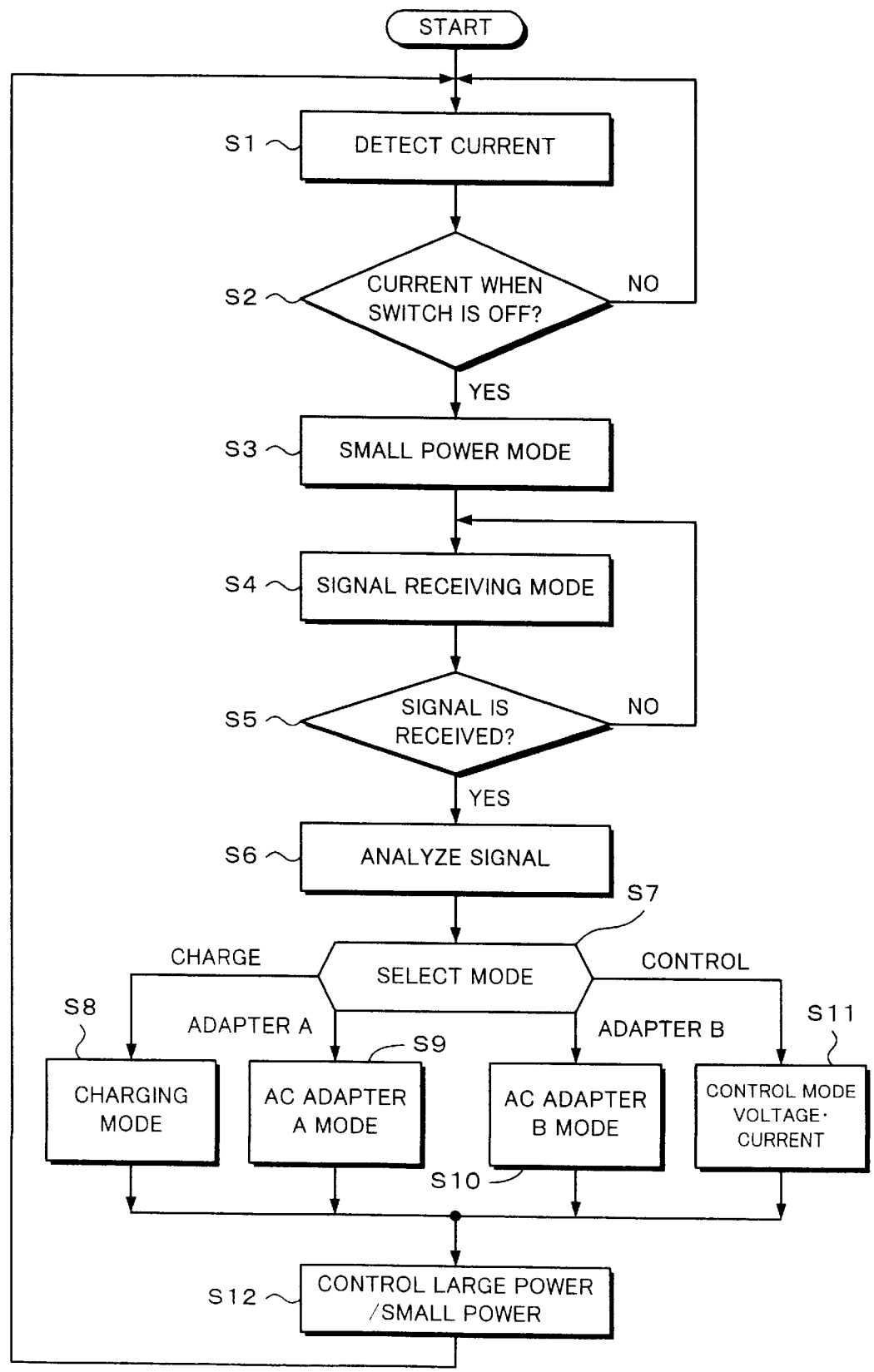
FIG. 15 is a flowchart showing an embodiment of processes of an AC adapter to which the invention is applied.

Flowcharts for explaining the operations of the constructions of FIGS. 12, 13, and 14 mentioned above are shown in FIGS. 15 and 16. First, the operation of the AC adapter 2 will be described with reference to the flowchart of FIG. 15. In step S1, a current is detected. In step S2, a check is made to see if the detected current is a current at the time of the OFF state of the switching circuit. When it is decided that the switching circuit is in the OFF state, a control is shifted to step S3. When it is determined that the switching circuit is in the ON state, a control is returned to step S1.

Since the switching circuit is decided to be OFF, the AC adapter 2 is operated in the small power mode in step S3. In step S4, the AC adapter 2 is set to the signal receiving mode. Whether the signal has been received or not is discriminated in step S5. When it is decided that the signal has been received, a control is shifted to step S6. When it is determined that the signal is not received, a control is returned to step S4. In step S6, the received signal is analyzed.

In step S7, the mode is selected in accordance with an analysis result and in case of outputting a voltage/current for charging, a control advances to step S8. In case of outputting a voltage/current which is set to an AC adapter A, a control advances to step S9. In case of outputting a voltage/current which is set to an AC adapter B, a control advances to step S10. In case of controlling a voltage/current and outputting, a control advances to step S11. In step S8, the AC adapter 2 is set to the charging mode for outputting a voltage/current to charge the secondary battery of the set 3.

In step S9, the AC adapter 2 is set to an AC adapter A mode for outputting a voltage/current as an AC adapter to the set 3. In step S10, the AC adapter 2 is set to an AC adapter B mode for outputting a voltage/current as an AC adapter to the set 3. In this instance, although both of the AC adapter A mode and the AC adapter B mode are modes for supplying the voltage/current as an AC adapter to the set 3, they are the modes in which, for example, values of the voltages and/or values of the currents are different.

In step S11, the AC adapter 2 is set to a control mode for outputting a value of the voltage/current controlled to the set 3. In this example, the voltage/current is raised in this control mode. Specifically speaking, when this mode is set, the voltage is raised by only ΔV and is outputted from the AC adapter 2 to the set 3. Similarly, the current is raised by only ΔI and is outputted from the AC adapter 2 to the set 3. In step S12, the large power circuit and/or the small power circuit is controlled in accordance with the set mode. A control is returned to step S1.

Figure 16:
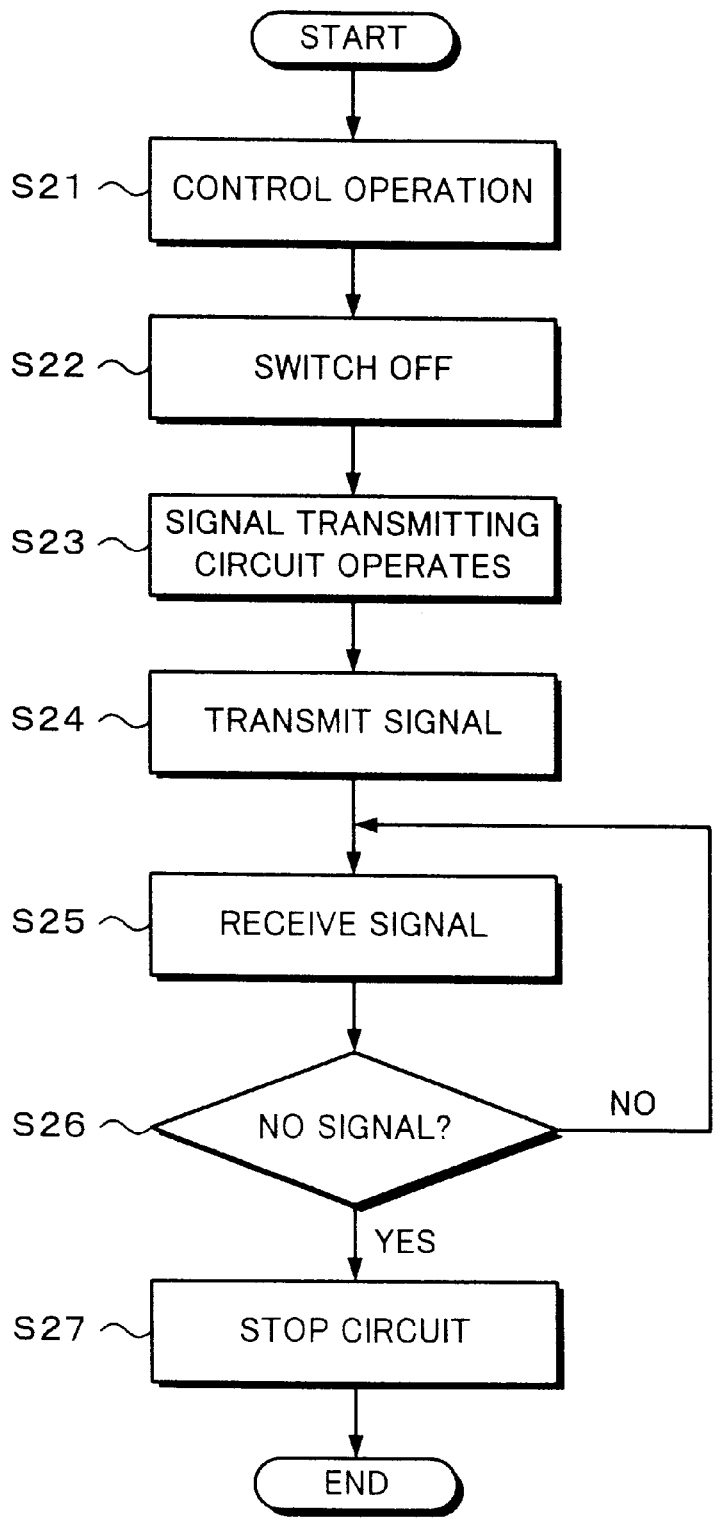
FIG. 16 is a flowchart showing an embodiment of processes on the set side to which the invention is applied.

The operation of the set 3 will now be described with reference to a flowchart of FIG. 16. In step S21, the control circuit of the set 3 operates. In step S22, the switching circuit is switched from ON to OFF. In step S23, the signal transmitting circuit is made operative. In step S24, the ON/OFF operation of the switching circuit is switched and a signal is transmitted. In step S25, the transmitted signal is received by the signal receiving circuit. In step S26, the presence or absence of the received signal is discriminated. When it is determined that the signal exists, a control is returned to step S25. When the absence of the signal is decided, a control advances to step S27. In step S27, the operation of the whole circuit of the set 3 is stopped. In the embodiment, after the control circuit was operated, the switching circuit is turned off and the signal transmitting circuit is made operative. However, the signal transmitting circuit can be made operative from the beginning. That is, the flowchart can be also started from step S23.

FIG. 17 shows a detailed circuit diagram of the signal transmitting circuit for transmitting the signal from the set 3. In the AC adapter 2, a small power/large power circuit 141 is controlled by a control circuit 142 and the AC adapter 2 is first operated by a small electric power. The signal transmitting circuit of the set 3 will now be described. A collector of an NPN-type transistor 144 is connected to a cathode of a Zener diode 147, an emitter is connected to the ground through a resistor 146, and a base is connected to a collector of an NPN-type transistor 145. A base of the transistor 145 is connected to the emitter of the transistor 144 and an emitter is connected to the ground. A resistor 148 is inserted between an anode of the Zener diode 147 and an emitter of a PNP-type transistor 149. A resistor 150 is inserted between the emitter and a base of the transistor 149. A collector of the transistor 149 is connected to the collector of the transistor 145 and the base is connected to a collector of an NPN-type transistor 152 through a resistor 151. An emitter of the transistor 152 is connected to the ground.

A constant voltage circuit 153 and a circuit 154 are serially inserted between the cathode of the Zener diode 147 and the ground. A regulator of 3V in which a current of 5 to 7 mA flows is used as a constant voltage circuit 153. The circuit 154 is a circuit such as secondary battery, cellular phone, or the like.

Figure 18A:
FIGS. 18A, 18B, and 18C are schematic diagrams of examples for explaining the invention.

A signal shown in FIG. 18A is supplied to a base of the transistor 152. When a signal which is supplied to the base of the transistor 152 is turned on, the transistors 149 and 144 are turned on. When the signal which is supplied to the base of the transistor 152 is turned off, the transistors 149 and 144 are turned off. As mentioned above, by supplying the ON/OFF signal to the base of the transistor 152 and turning on/off the transistor 152, the transistor 144 can be turned on/off.

Figure 18B:
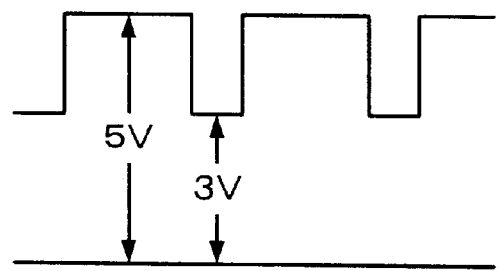
Figure 18C:
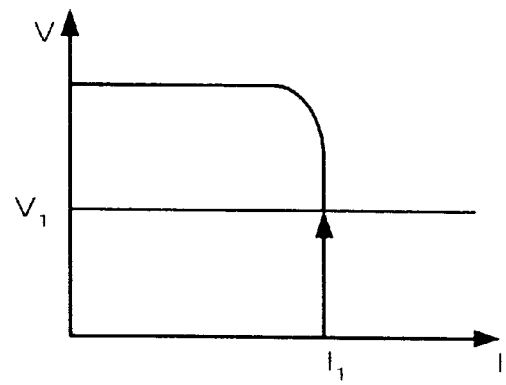

At this time, for instance, in the case where the Zener diode 147 is turned on by 3V, as shown in FIG. 18B, when the transistor 152 is ON, the signal level is set to 3V and when the transistor 152 is OFF, it is set to 5V. The transistor 144 is turned on for a period of time corresponding to the output voltage. As shown in FIG. 18C, the transistor 152 is turned on and the transistor 149 is turned on. In this instance, since the constant current is larger than a current $I_1$ (small power mode) up to the Zener diode 147, the current of up to a voltage $V_1$ of the Zener diode 147 flows in the transistors 144 and 145. By turning on/off the transistor 152, therefore, a signal shown in FIG. 18B can be formed.

For example, the signal of FIG. 18B is transmitted from the set 3 and is received by the signal receiving circuit 143 of the AC adapter 2. The received signal is supplied to the control circuit 142. The control circuit 142 controls the small power/large power circuit 141 and switches so as to make the AC adapter operative by the large electric power.

FIGS. 19A and 19B show the fifth embodiment with the schematic construction of the second example of FIG. 6 mentioned above. The AC adapter 2 turns on a switching circuit 174 and is operated by the small power circuit 172 and large power circuit 173. A switch OFF signal to turn off a switching circuit 184 on the set side is supplied from a switch OFF signal circuit 180 to a switch OFF confirming circuit 175, a signal transmission confirming circuit 177, and the small power circuit 172. In this instance, a switch OFF signal to turn off the switching circuit 184 is transmitted from the small power circuit 172. The signal transmission confirming circuit 177 confirms that after a signal was supplied from the switch OFF signal circuit 180, a signal to turn off the switching circuit 184 has been transmitted from the small power circuit 172. When a switch OFF signal circuit 183 of the set 3 is turned off in response to such a signal, the OFF state is detected by a current detecting circuit 171.

In the switch OFF confirming circuit 175, after the signal from the switch OFF signal circuit 180 was supplied, when the OFF state is detected by the current detecting circuit 171, the signal is supplied to the switching circuit 174, a signal transmitting circuit 176, and a timer circuit 178. The switching circuit 174 to which such a signal was supplied is turned off. That is, the AC adapter 2 is operated by only the small power circuit 172. In the timer circuit 178, the signal is supplied to a stopping circuit 179 after the elapse of a predetermined time. The stopping circuit 179 to which the signal from the timer circuit 178 was supplied transmits a signal to stop the operations of the small power circuit 172 and large power circuit 173 to each of them. To transmit a signal, the signal transmitting circuit 176 supplies the signal to the signal transmission confirming circuit 177. The signal transmission confirming circuit 177 transmits the signal on the basis of the signal from the signal transmitting circuit 176 and the signal from the switch OFF signal circuit 180 and confirms that the signal has been transmitted.

In the set 3, the current is detected by a current detecting circuit 181 and the detected current is supplied to a switch OFF confirming circuit 182. The voltage is detected by the voltage detecting circuit 185 and the detected voltage is supplied to the switch OFF confirming circuit 182. In the switch OFF signal circuit 183, the signal to turn off the switching circuit 184 is received from the AC adapter 2, this signal is supplied to the switch OFF confirming circuit 182 and turns off the switching circuit 184. In the switching circuit 184, the OFF state of the switching circuit 184 is confirmed on the basis of the current from the current detecting circuit 181, a voltage from a voltage detecting circuit 185, and a signal from the switch OFF signal circuit 183.

When the OFF state of the switching circuit 184 is confirmed, the signal is transferred from the switch OFF confirming circuit 182 to the signal receiving circuit 186. When the current detecting circuit 171 detects that the switching circuit 184 has been turned off, the AC adapter 2 is operated by the small electric power and, thereafter, the signal is transmitted. When this signal is received after the signal from the switch OFF confirming circuit 182, a signal receiving circuit 186 supplies the signal to a control circuit 187 and a processing circuit 188. The control circuit 187 performs a control according to the supplied signal. For example, the signal is supplied to a signal transmitting circuit 189 or the like to further transmit the signal from the set 3. The processing circuit 188 performs a display of a temperature of the power supplying portion on the set side, a charging capacity of the secondary battery, or the like and a switching of a control of the voltage/current.

Figure 20:
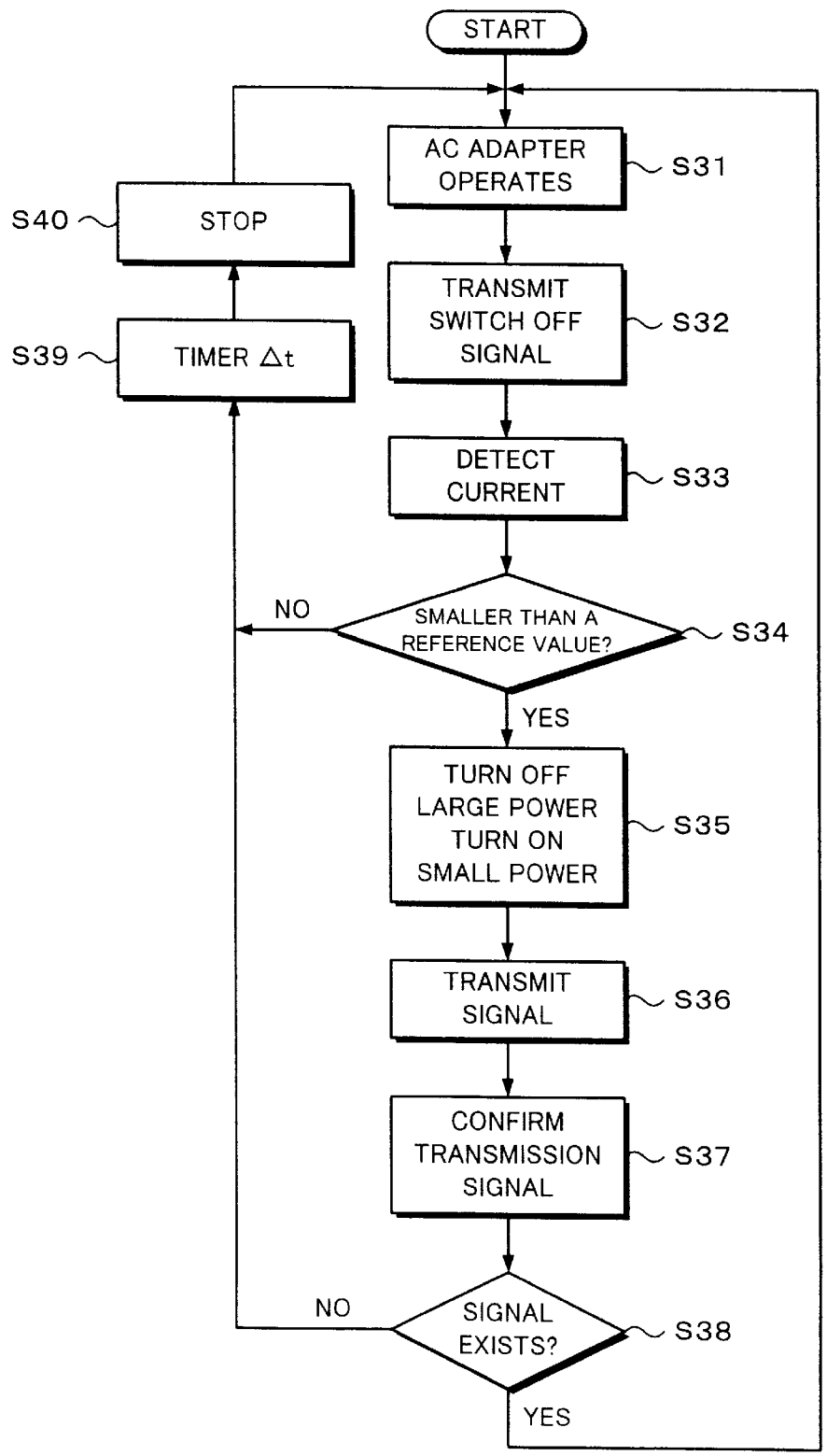
FIG. 20 is a flowchart showing an embodiment of processes of the AC adapter to which the invention is applied.
Figure 21:
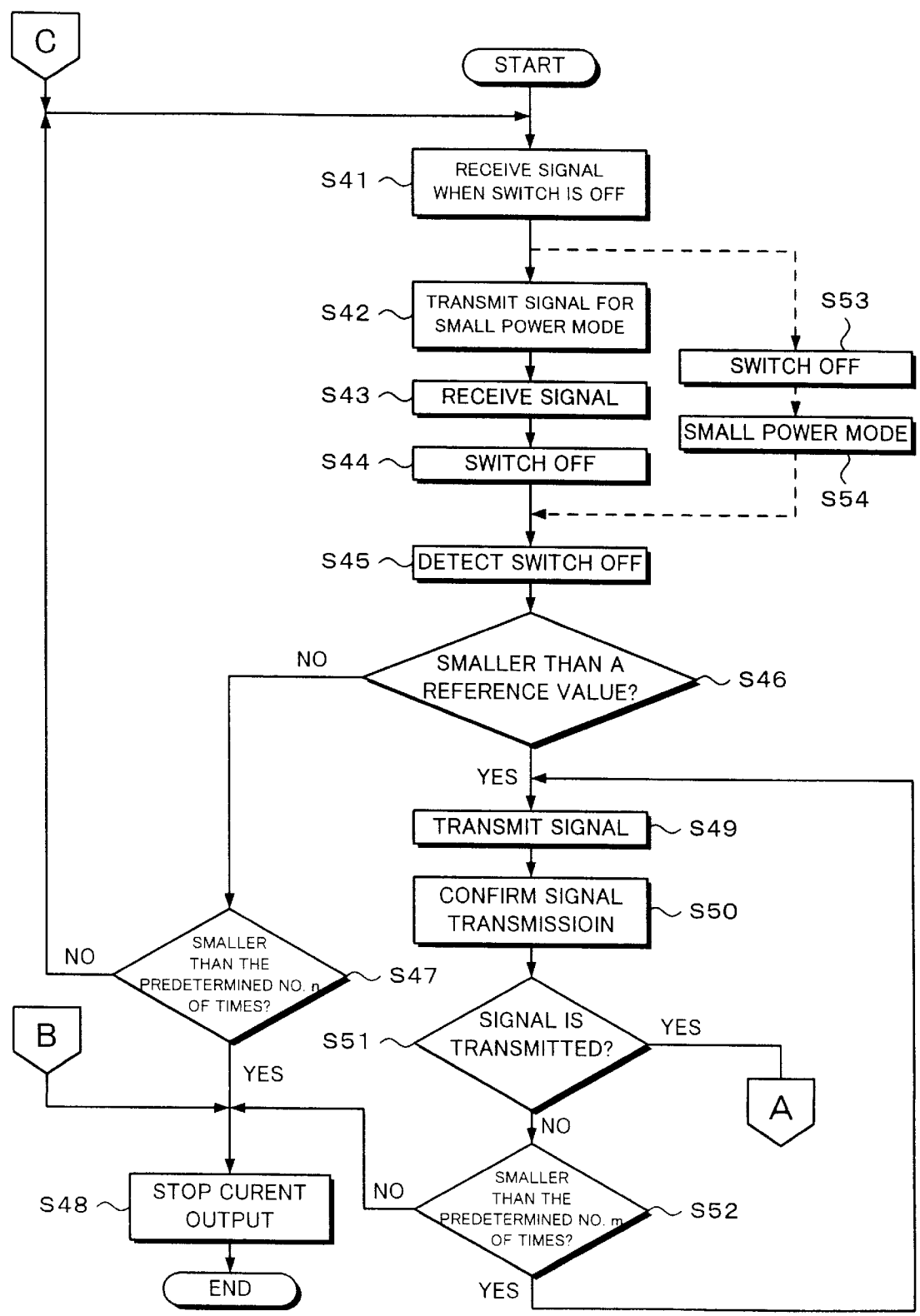
FIG. 21 is a flowchart showing an embodiment of processes on the set side to which the invention is applied.
Figure 22:
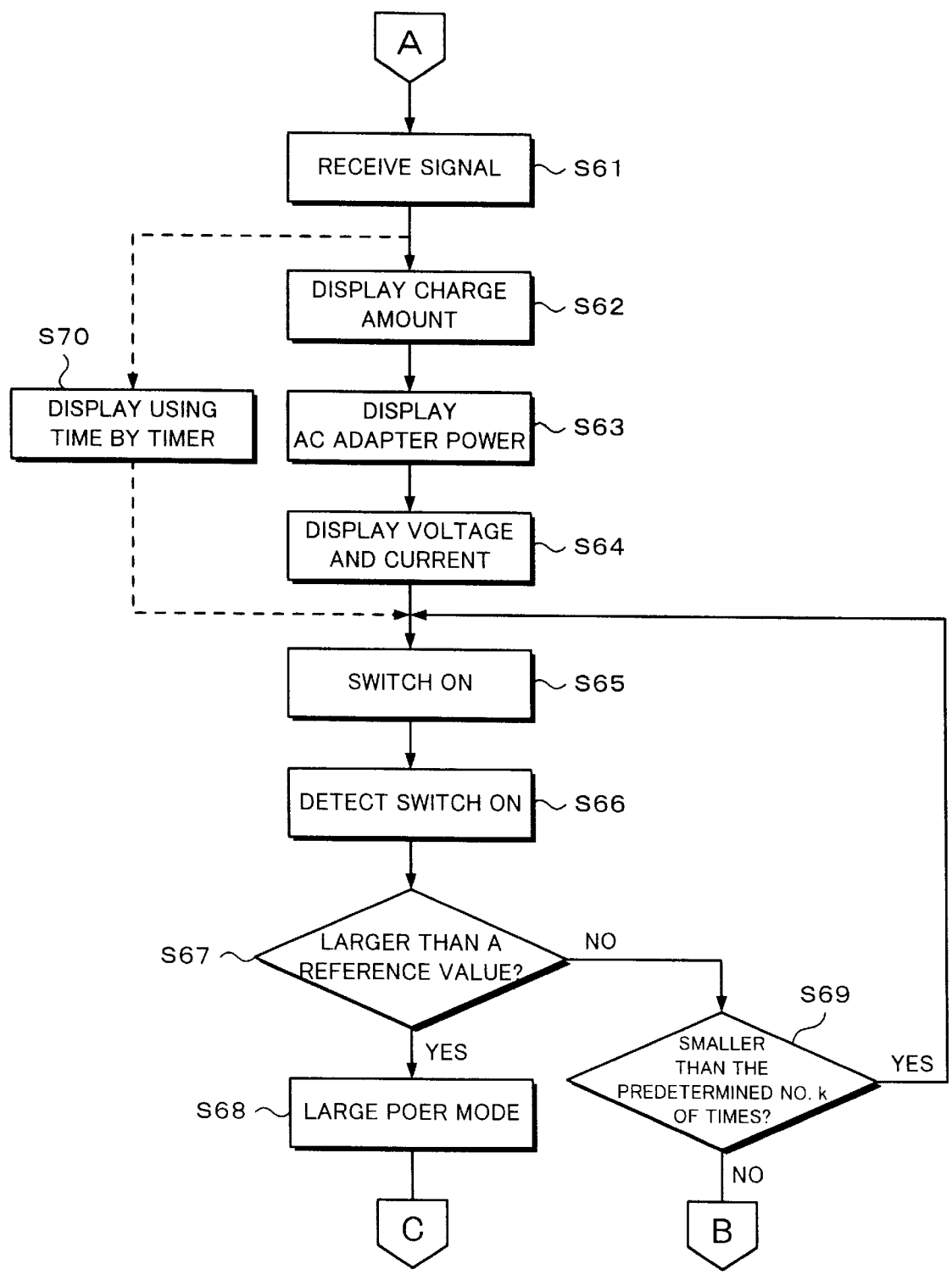
FIG. 22 is a flowchart showing an embodiment of processes on the set side to which the invention is applied.

FIGS. 20, 21, and 22 show flowcharts for explaining the operation of the construction of FIGS. 19A and 19B mentioned above. In step S31, the AC adapter 2 operates. In step S32, the switch OFF signal to turn off the switching circuit 184 is transmitted from the AC adapter 2 to the set 3. In step S33, the current is detected by the current detecting circuit 171 to detect the OFF state of the switching circuit 184. In step S34, whether the detected current is equal to or smaller than a reference value or not is discriminated. When it is decided that the detected current is equal to or smaller than the reference value, the switching circuit 184 is determined to be OFF. Therefore, a control advances to step S35. When it is decided that the detected current is larger than the reference value, since the switching circuit 184 is determined to be ON, a control advances to step S39.

In step S35, the switching circuit 174 is turned off. That is, in the AC adapter 2, the large power circuit 173 is turned off and the small power circuit 172 is turned on. In step S36, the signal is transmitted from the AC adapter 2 to the set 3. In step S37, the transmitted signal is confirmed. In step S38, the presence or absence of the signal transmitted from the AC adapter 2 is discriminated. When it is decided that the signal exists, a control is returned to step S31. When it is determined that the signal is absent, a control advances to step S39.

In step S39, the signal is delayed by time At by a timer. A control advances to step S40. In step S40, the large power circuit 173 is turned off and a control is returned to step S31.

In the flowchart of FIG. 20, when the switching circuit 184 is determined to be ON in step S34, a control advances to step S39. However, a control can be also shifted to step S32. When the connection is incomplete, the above discriminating process can be also executed by only a predetermined number of times in consideration of the case of the occurrence of a delay.

In the flowchart, a control is shifted to step S35 in the case where the switching circuit 184 is decided to be OFF in step S34. However, a control can be also shifted to step S36.

Further, in the flowchart, when the absence of the signal is decided in step S38, a control advances to step S39. However, a control can be also shifted to step S36.

FIGS. 21 and 22 show flowcharts of the embodiment for transmitting the signal from the AC adapter 2 to turn off the switching circuit of the set 3. In step S41, to turn off the switching circuit, the switch OFF signal is transmitted from the AC adapter 2. In step S42, the AC adapter is operated by only the small power circuit and the signal to set the small power mode is transmitted. In step S43, the transmitted signal is received by the set 3. In step S44, the switching circuit is turned off.

In the embodiment, although a control advances to step S42 after the control in step S41, a control can be also shifted to step S53 shown by a broken line. In this case, the switching circuit is turned off in step S53. In step S54, the operating mode is set to the small power mode in which the AC adapter 2 is operated by only the small power circuit.

In step S45, the current is detected by the current detecting circuit in order to detect the OFF state of the switching circuit. In step S46, whether the detected current is equal to or smaller than a reference value or not is discriminated. When it is determined that the detected current is larger than the reference value, a control advances to step S47. When it is decided that the detected current is equal to or smaller than the reference value, a control advances to step S49. That is, by checking the current detected by the current detecting circuit, the ON/OFF state of the switching circuit is discriminated.

In step S47, whether the number of times of execution of the control in step S46 is equal to or smaller than a predetermined number (n) of times or not is discriminated. When it is equal to or smaller than the predetermined number (n) of times, a control is returned to step S41. When it is larger than (n), a control advances to step S48. That is, the processing routine is repeated by only the predetermined number (n) of times in consideration of the case where the connection of the switching circuit is incomplete. In step S48, the power source which is outputted from the AC adapter 2 is stopped.

In step S49, a signal to notify of a fact that the switching circuit has been turned off is transmitted. In step S50, the transmitted signal is received and it is confirmed that the signal has been transmitted. In step S51, a check is made to see if the confirmed signal is the transmitted signal. If it is decided that the confirmed signal is the transmitted signal, a control advances to step S61. If it is determined that the confirmed signal is not the transmitted signal, a control advances to step S52.

In step S52, whether the number of times of execution of the control in step S51 is equal to or smaller than a predetermined number (m) of times or not is discriminated. When it is equal to or smaller than the predetermined number (m) of times, a control is returned to step S49. When it is larger than (m), a control advances to step S48. That is, the processing routine is repeated by only the predetermined number (m) of times in consideration of a delay of the signal transmission or the like.

In step S61, the transmitted signal is received on the set side. A charge amount is displayed in step S62. A power of the AC adapter 2 is displayed in step S63. The voltage/current is displayed in step S64.

In the embodiment, after the control in step S61, a control advances to step S62. However, a control can be also shifted to step S70. The control in step S70 can be also performed in parallel with steps S62, S63, and S64. In this case, a time while the AC adapter is used is displayed by a timer in step S70.

The switching circuit of the set 3 is turned on in step S65. In step S66, to detect the ON state of the switching circuit, the current is detected by the current detecting circuit. In step S67, whether the detected current is equal to or larger than a reference value or not is discriminated. When it is determined that the detected current is equal to or larger than the reference value, a control advances to step S68. When it is decided that the detected current is smaller than the reference value, a control advances to step S69. That is, the ON/OFF state of the switching circuit is discriminated by checking the current detected by the current detecting circuit.

In step S68, the AC adapter 2 is set to the large power mode in which it is operated by the large power circuit and a control is returned to step S41. In step S69, whether the number of times of execution of the control in step S67 is equal to or smaller than a predetermined number (k) of times or not. When it is equal to or smaller than the predetermined number (k) of times, a control is returned to step S49. When it is larger than (k), a control advances to step S48. That is, the processing routine is repeated by only the predetermined number (k) of times in consideration of a case where the connection of the switching circuit is imperfect. A control advances to step S48.

Figure 23:
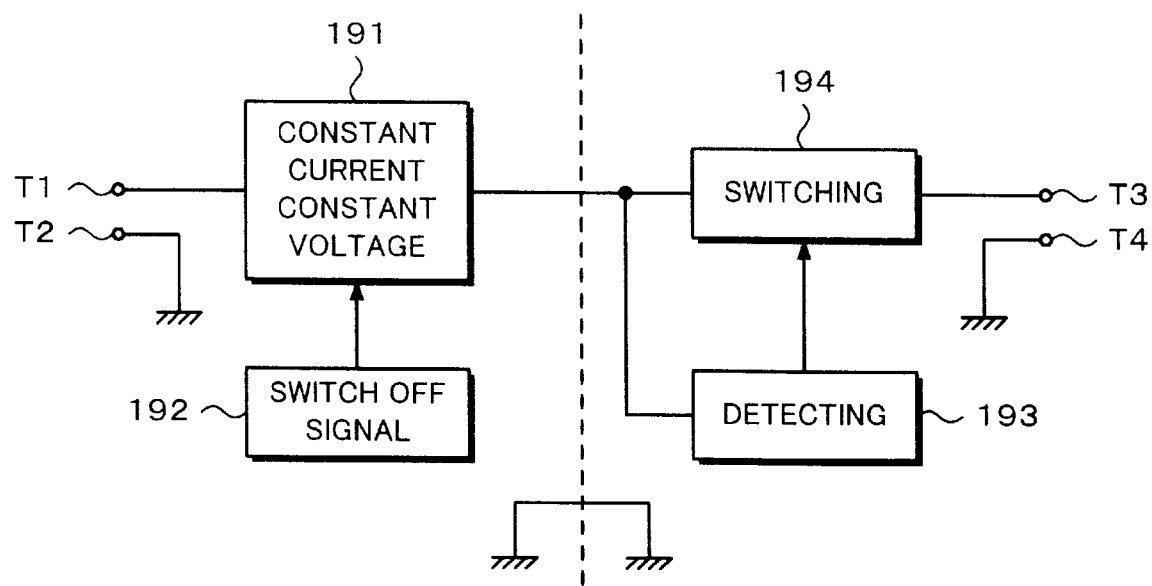
FIG. 23 is a block diagram for explaining a switch OFF signal which is applied to the invention.
Figure 24:
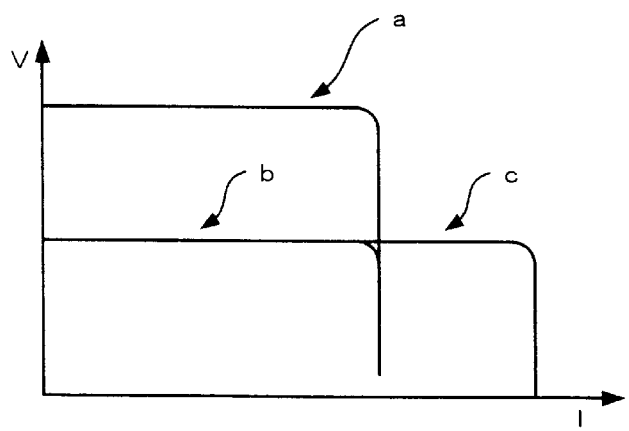
FIG. 24 is a schematic diagram for explaining a switch OFF signal which is applied to the invention.
Figure 25A:
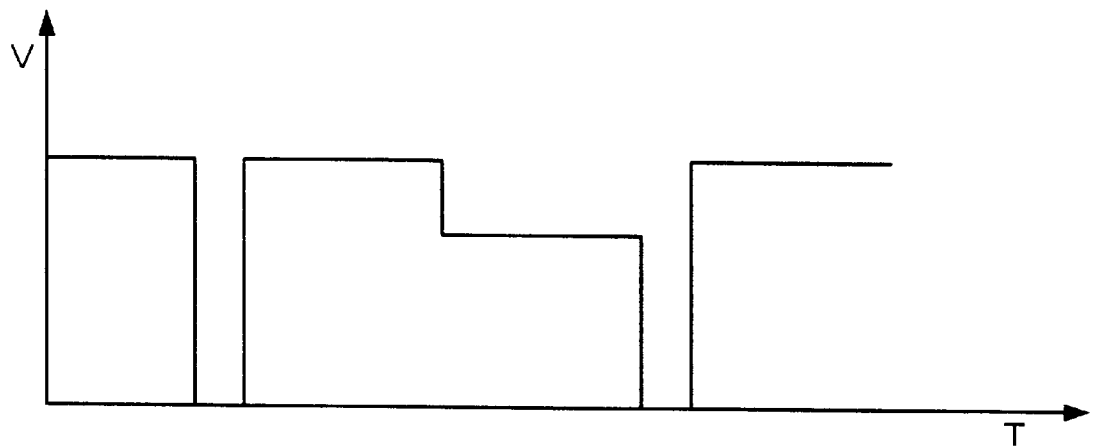
FIGS. 25A and 25B are schematic diagrams for explaining switch OFF signals which is applied to the invention.
Figure 25B:
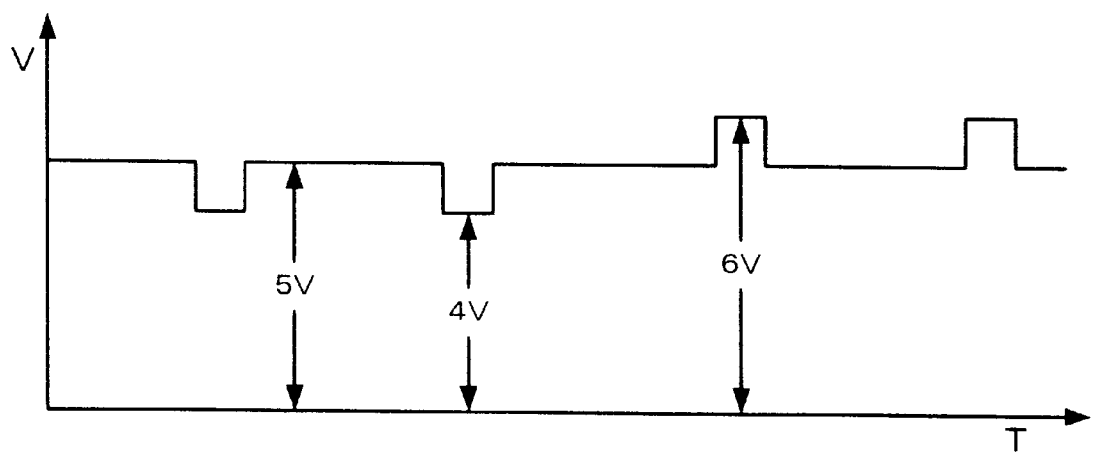

The switch OFF signal which is transmitted from the AC adapter 2 will now be described with reference to FIGS. 23, 24, and 25. In the AC adapter 2, to turn off a switching circuit 194, a switch OFF signal is supplied from a switch OFF signal circuit 192 to a constant current constant voltage circuit 191. An example of voltage/current characteristics of the constant current constant voltage circuit 191 is shown in FIG. 24. For example, characteristics (a) shown in FIG. 24 are set to 5V/1A, characteristics (b) are set to 3V/1A, and characteristics (c) are set to 3V/1.5A. In the constant current constant voltage circuit 191, for example, a predetermined signal as shown in FIG. 25A is outputted as a switch OFF signal. When the switch OFF signal is detected by a detecting circuit 193, the switching circuit 194 is turned off. When the switching circuit 194 is turned off, a predetermined signal as shown in FIG. 25B is outputted from the constant current constant voltage circuit 191.

The operation of FIG. 7 with the schematic construction of the third example mentioned above will now be described with reference to flowcharts of FIGS. 26 and 27. First, the flowchart for the operation of the AC adapter 2 shown in FIG. 26 operates, for example, at the time of the first AC input. In step S71, a signal to turn off the switching circuit of the set 3 is transmitted. In step S72, the current is detected by the current detecting circuit. In step S73, whether the detected current is equal to or smaller than a reference value or not is discriminated. When it is determined that the detected current is equal to or smaller than the reference value, since the switching circuit is decided to be OFF, a control advances to step S74. When it is decided that the detected current is larger than the reference value, since the switching circuit is decided not to be OFF, a control is returned to step S72. The signal is transmitted from the AC adapter 2 in step S74. By this signal transmission, a fact that the AC adapter 2 has the priority is notified to the set 3. The signal transmission is stopped in step S75. In step S76, the AC adapter 2 is controlled so that it can receive the signal which is transmitted from the set 3.

The flowchart for the operation of the set 3 shown in FIG. 27 is activated when, for instance, the temperature of the secondary battery rises or a DC power source is applied. The switching circuit is turned off in step S81. In step S82, it will be understood that the AC adapter 2 has been switched to the small power mode which is operated by a small electric power. In step S83, the signal is transmitted from the set 3. By this signal transmission, a fact that the set 3 has the priority is notified to the AC adapter 2. In step S84, the signal transmission is stopped. In step S85, the set 3 is controlled so that it can receive the signal which is transmitted from the AC adapter 2.

Figure 28:
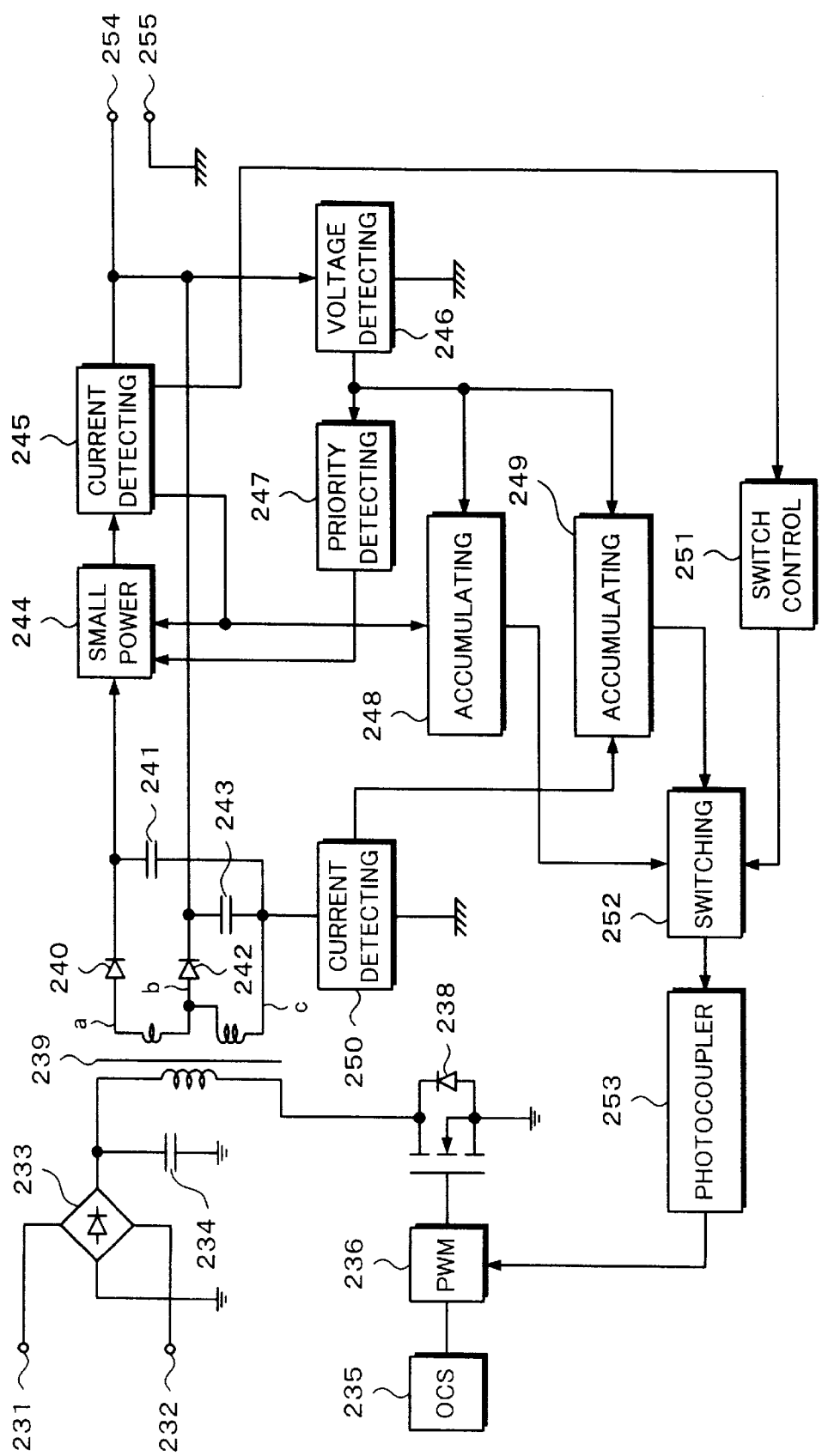
FIG. 28 is a block diagram showing the sixth embodiment to which the invention is applied.

FIG. 28 shows the sixth embodiment using a switching regulator at the front stage of the input terminals T1 and T2 of the AC adapter 2. A commercially available power source is supplied from input terminals 231 and 232 and is connected to one end of the primary side of a transformer 239 through a diode bridge 233. One of outputs of the diode bridge 233 is connected to the ground through a capacitor 234 and is also connected to the transformer 239. The other end of the diode bridge 233 is connected to the ground. A cathode of a diode 238 is connected to the other end of the primary side of the transformer 239 and an anode is connected to the ground. The diode 238 is inserted between a source and a drain of an FET 237. A PWM (pulse width modulation) circuit 236 is connected to a gate of the FET 237. The FET 237 is turned on/off by the PWM circuit 236 and the switching operation is controlled. Signals are supplied to the PWM circuit 236 from an OSC (oscillator) circuit 235 and a photocoupler 253.

An anode of a diode 240 is connected to an (a) terminal of the secondary side of the transformer 239 and a cathode is connected to a small power circuit 244. An anode of a diode 242 is connected to a (b) terminal of the secondary side of the transformer 239 and a large electric power is outputted and a cathode is connected to an output terminal 254. An output terminal 255 is connected to the ground. A capacitor 241 is inserted between a (c) terminal of the secondary side of the transformer 239 and the cathode of the diode 240, a capacitor 243 is inserted between the (c) terminal and the diode 242, and a current detecting circuit 250 is inserted between the (c) terminal and the ground. The current detected by the current detecting circuit 250 is supplied to an accumulating circuit 249.

The small power circuit 244 is constructed by a constant voltage constant current circuit and generates a small electric power. A current detecting circuit 245 detects the current that is outputted from the small power circuit 244. The detected current is supplied to the small power circuit 244, an accumulating circuit 248, and a switch control circuit 251. A voltage detecting circuit 246 detects the voltage which is outputted from the output terminal 254. The detected voltage is supplied to a priority detecting circuit 247 and the accumulating circuits 248 and 249. The priority detecting circuit 247 detects whether the signal transmitted from the set 3 is included in the supplied voltage or not. A detection result is supplied to the small power circuit 244.

The accumulating circuit 248 accumulates the current from the current detecting circuit 245 and the voltage from the voltage detecting circuit 246. An accumulation result is supplied to a switching circuit 252. The accumulating circuit 249 accumulates the current from the current detecting circuit 250 and the voltage from the voltage detecting circuit 246. An accumulation result is supplied to the switching circuit 252. The switching circuit 252 is controlled by the switch control circuit 251 and either one of the accumulation results from the accumulating circuits 248 and 249 is selected. The selected accumulation result is supplied to the photocoupler 253. The photocoupler 253 controls the operation of the PWM circuit 236 in accordance with the supplied accumulation result.

Figure 29:
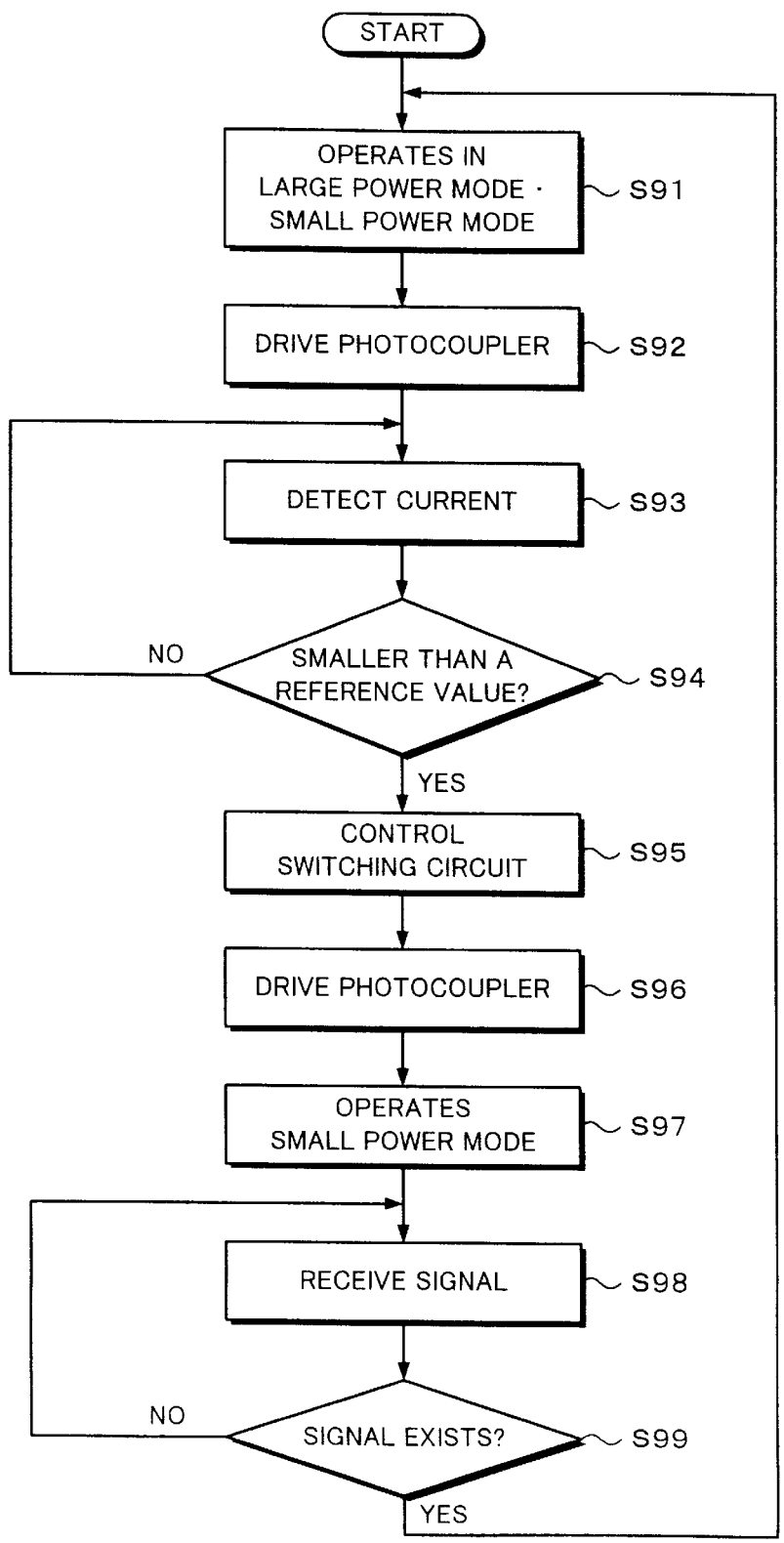
FIG. 29 is a flowchart showing an embodiment of processes of the AC adapter to which the invention is applied.

The operation of the AC adapter 2 using the switching regulator shown in FIG. 28 will now be described with reference to the flowchart of FIG. 29. In step S91, the AC adapter 2 is operated by the large electric power and the small electric power. In step S92, the accumulating circuit 249 is selected by the switching circuit 252. The photocoupler 253 is driven in accordance with the accumulation result from the selected accumulating circuit 249. In step S93, the current is detected by the current detecting circuit 250.

In step S94, whether the detected current is equal to or smaller than a reference value or not is discriminated. When it is decided that the detected current is equal to or smaller than the reference value, since it is determined that no load is connected, a control advances to step S95. When it is decided that the detected current is larger than the reference value, since it is determined that the load has been connected, a control is returned to step S93. In step S95, the switching circuit 252 is controlled.

In step S96, the accumulating circuit 248 is selected by the switching circuit 252. The photocoupler 253 is driven in accordance with the accumulation result from the selected accumulating circuit 248. In step S97, the PWM circuit 236 is controlled by the photocoupler 253 so that the AC adapter 2 is operated by the small electric power. In step S98, the signal is received. The presence or absence of the signal is discriminated in step S99. When it is decided that the signal exists, a control is returned to step S91. When the absence of the signal is determined, a control is returned to step S98.

Figure 30:
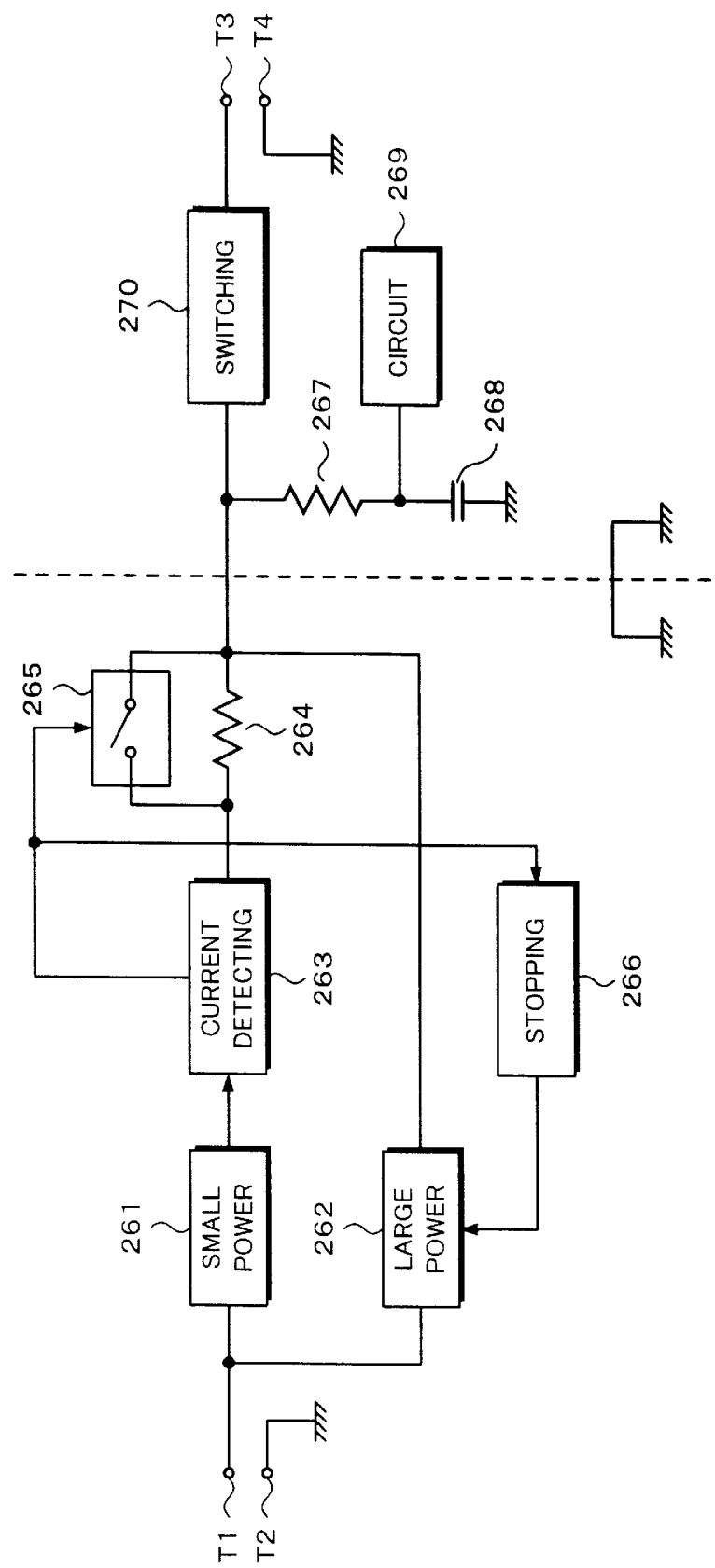
FIG. 30 is a block diagram showing the seventh embodiment to which the invention is applied.

FIG. 30 shows the seventh embodiment to form a high impedance power source by inserting a switching circuit and a resistor in parallel with the output of the small electric power. The input terminal T1 is connected to a small power circuit 261 and a large power circuit 262. A power source of the small electric power is outputted from the small power circuit 261. A current detecting circuit 263 detects the current from the small power circuit 261. The detected current is supplied to a switching circuit 265 and a stopping circuit 266. When the supplied current is equal to or smaller than a reference value, the switching circuit 265 is turned off. When the current is larger than the reference value, the switching circuit 265 is turned on. A resistor 264 is provided in parallel with the switching circuit 265. When the supplied current is equal to or smaller than the reference value, the stopping circuit 266 outputs a control signal so as to stop the large power circuit 262. When the current is larger than the reference value, a control signal is outputted so as to make the large power circuit 262 operative.

In the set 3, one end of a switching circuit 270 is connected to the output terminal T3. A resistor 267 and a capacitor 268 are serially inserted between the other end of the switching circuit 270 and the ground. A node of the resistor 267 and capacitor 268 is connected to a circuit 269 comprising, for example, a signal generating circuit and a signal receiving circuit as mentioned above.

In the embodiment, although the resistor 264 and switching circuit 265 are provided on the output side of the small power circuit 261, they can be also provided on the output side of the large power circuit 262. In this case, the switching circuit is large in scale.

Figure 31:
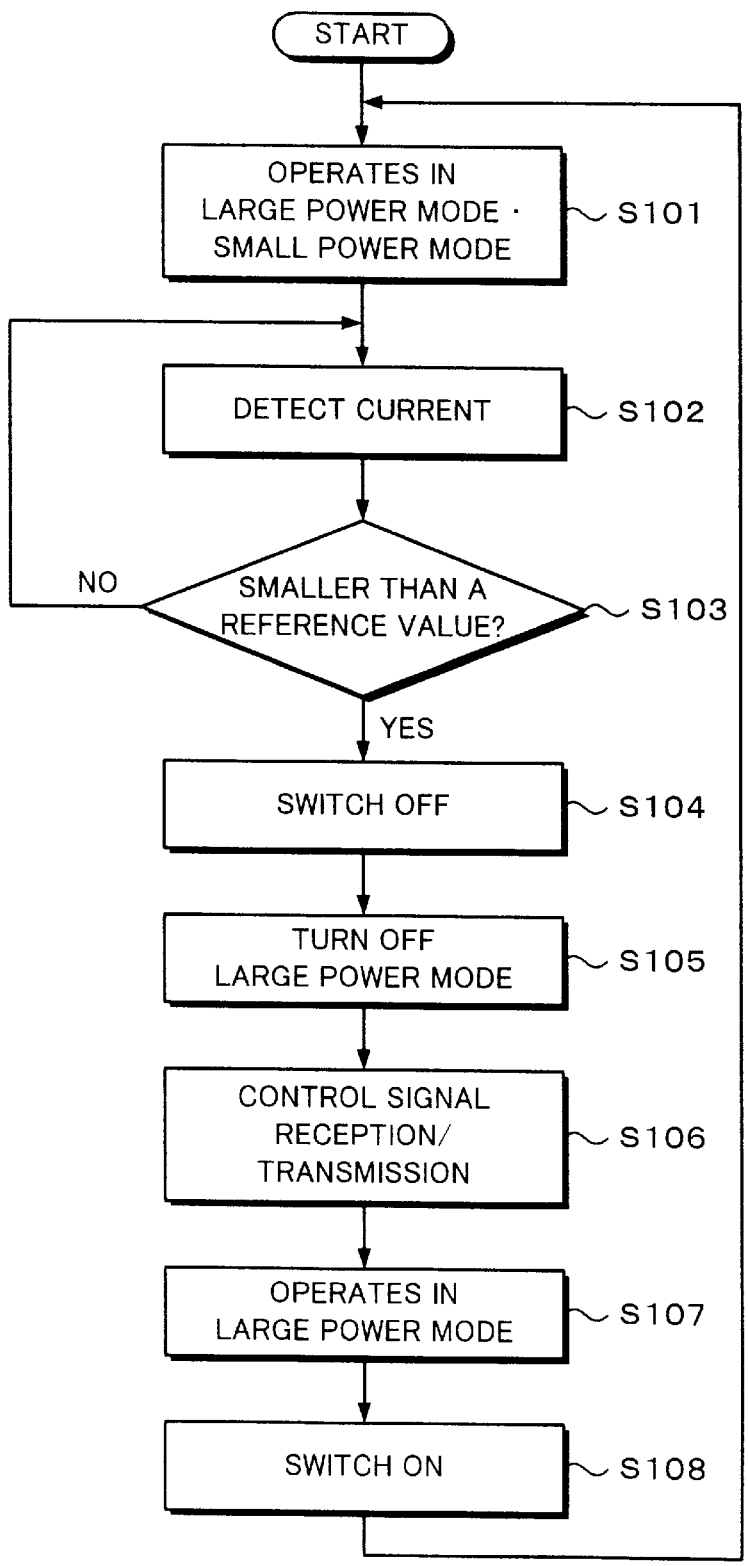
FIG. 31 is a flowchart showing an embodiment of processes of the AC adapter to which the invention is applied.

The operation of the AC adapter shown in FIG. 30 will now be described with reference to a flowchart shown in FIG. 31. In step S101, the AC adapter is operated by the large electric power and the small electric power. In step S102, the current is detected by the current detecting circuit 263. In step S103, whether the detected current is equal to or smaller than a reference value or not is discriminated. When it is decided that the detected current is equal to or smaller than the reference value, since it is determined that the switching circuit 270 is OFF or in a state near a non-load, a control advances to step S104. When it is decided that the current is larger than the reference value, since it is determined that the switching circuit 270 is ON, a control is returned to step S102.

In step S104, the switching circuit 265 is changed from the ON state to the OFF state. In step S105, the large power circuit 262 is controlled by the stopping circuit 266 so as to stop the operation. In step S106, a control of the signal reception or signal transmission is performed. In step S107, the large power circuit 262 is controlled by the stopping circuit 266 so as to operate. In step S108, the s witching circuit 265 is chang ed from the OFF state to the ON state. A control is returned to step S101.

Figure 32:
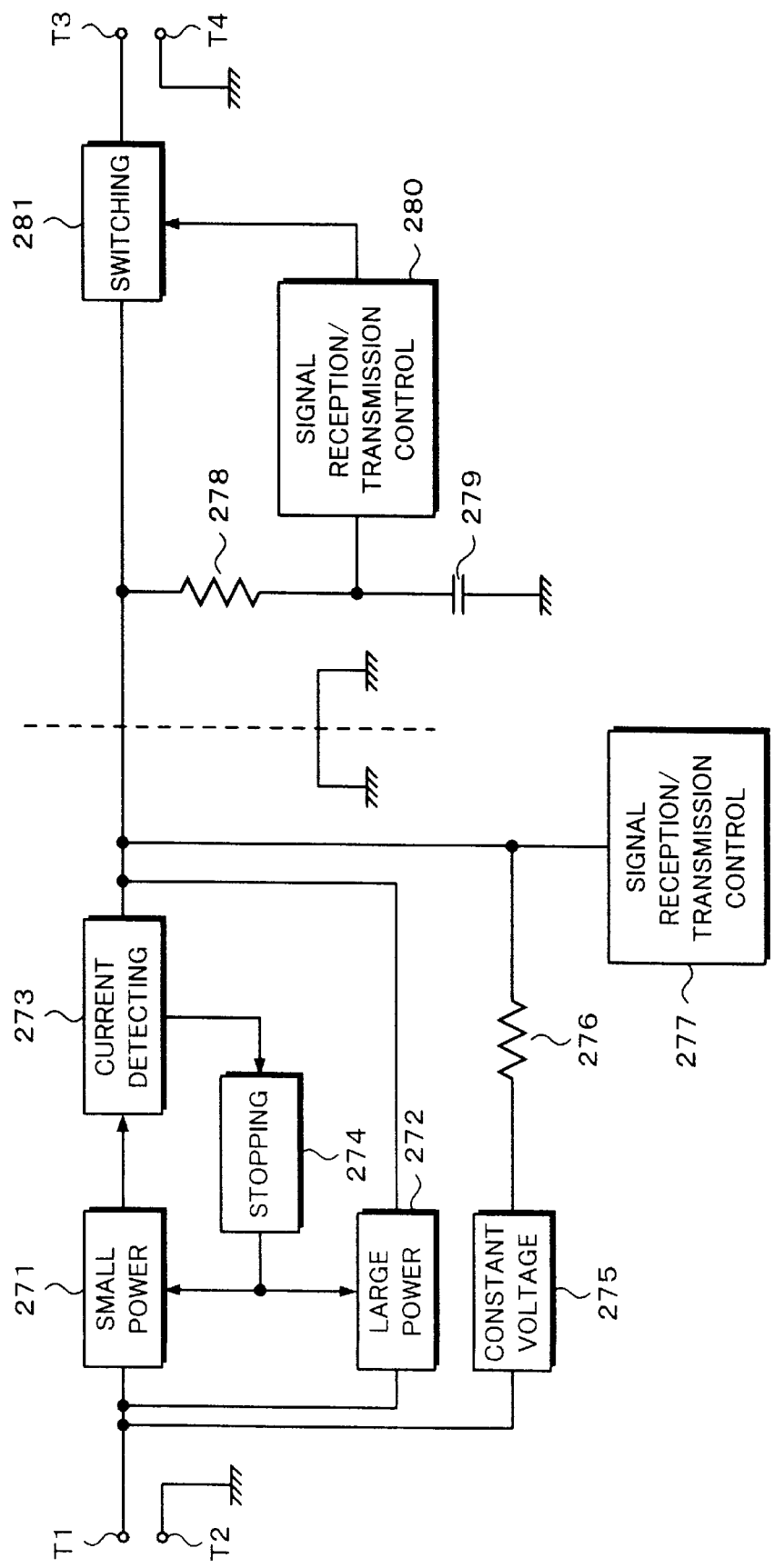
FIG. 32 is a block diagram showing the eighth embodiment to which the invention is applied.

FIG. 32 shows the eighth embodiment using a power source of a high impedance when the signal is received/transmitted. A small power circuit 271 and a large power circuit 272 operate. A current detecting circuit 273 to detect a current from the small power circuit 271 supplies the detected current to a stopping circuit 274. The stopping circuit 274 controls so as to stop the operations of the small power circuit 271 and large power circuit 272 on the basis of the detected current. A constant voltage circuit 275 outputs an always stable voltage/current through a resistor 276. A signal reception/transmission control circuit 277 transmits the signal from the AC adapter 2 to the set 3 and receives the signal from the set 3.

One end of a switching circuit 281 is connected to the output terminal T3 and a resistor 278 and a capacitor 279 are serially inserted between the other end and the ground. A node of the resistor 278 and capacitor 279 is connected to a signal reception/transmission control circuit 280. The signal reception/transmission control circuit 280 transmits the signal from the set 3 to the AC adapter 2 and receives the signal from the AC adapter 2. When the signal from the AC adapter 2 is received, the signal reception/transmission control circuit 280 controls the ON/OFF operation of the switching circuit 281 on the basis of this signal.

Figure 33:
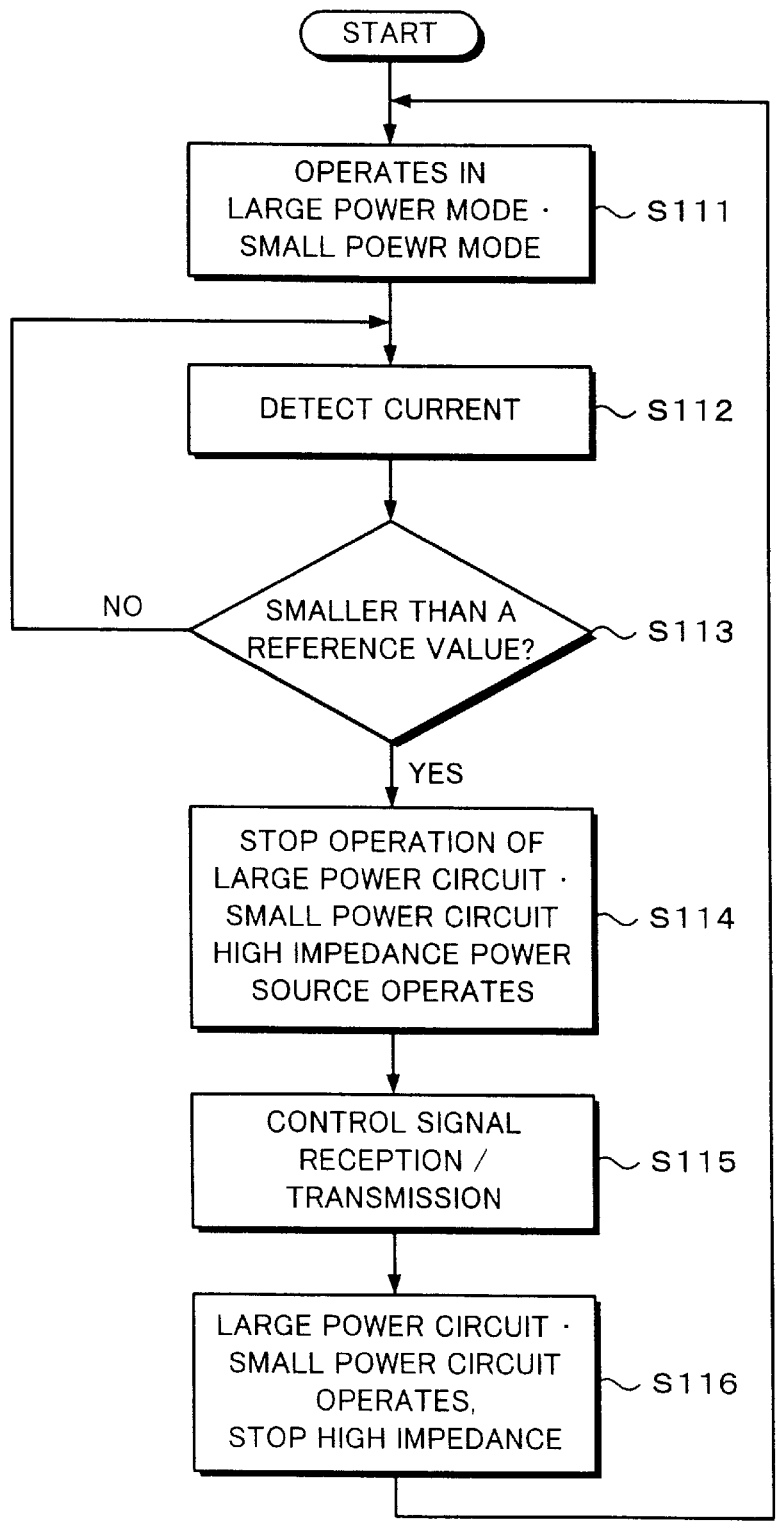
FIG. 33 is a flowchart showing an embodiment of processes of the AC adapter to which the invention is applied.

The operation of the AC adapter shown in FIG. 32 will now be described with reference to a flowchart shown in FIG. 33. In step S111, the small power circuit 271 and large power circuit 272 operate. In step S112, the current is detected by the current detecting circuit 273. In step S113, whether the detected current is equal to or smaller than a reference value or not is discriminated. When it is decided that the detected current is equal to or smaller than the reference value, since it is determined that the switching circuit 281 is OFF or in a state near a non-load, a control advances to step S114. When it is decided that the detected current is larger than the reference value, since it is determined that the switching circuit 281 is ON, a control is returned to step S112.

Figure 34:
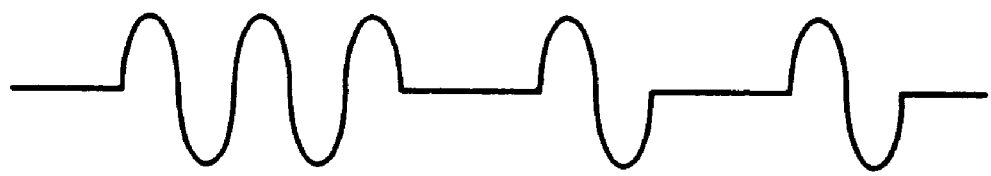
FIG. 34 is a schematic diagram for explaining the invention.

In step S114, the operations of the small power circuit 271 and large power circuit 272 are stopped and the operation of the power source of a high impedance is performed. In step S115, the signal reception/transmission control circuit 277 transmits the signal from the AC adapter 2 to the set 3 and receives the signal from the set 3. In step S116, the small power circuit 271 and large power circuit 272 operate and the operation of the power source of a high impedance is stopped. A control is returned to step S111. As mentioned above, the high impedance power source can transmit the signal as shown in FIG. 34.

Since a communication can be performed even by connecting the AC adapter and the set by two terminals, whether the AC adapter is an exclusive-use AC adapter or another AC adapter can be discriminated.

Therefore, even if the AC adapter and the set are used in accordance with the kind of secondary battery and the kind of AC adapter, the corresponding AC adapter can be selected by communicating, so that it is safe.

Since both of the AC adapter and the set can also communicate, it is sufficient that the capacity of the secondary battery, detection signal for temperature detection, and the like are prepared for either the AC adapter side or the set side.

According to the invention, even if a filter is not used, the signal can be transmitted, the costs can be suppressed, and it is strong against the noises.

According to the invention, the signal can be transmitted by two terminals and a ratio of the occurrence of defective connection can be reduced to a value smaller than that in case of connecting the AC adapter and the set by three terminals.

Further, according to the invention, since the current is detected on the AC adapter side and the set side, even if the terminals are short-circuited, no overcurrent flows, so that they can be safely used.

The present invention is not limited to the foregoing embodiments but many modifications and variations are possible within the spirit and scope of the appended claims of the invention.

What is claimed is:

1. A power supplying adapter connectable to electronic equipment by two terminals, comprising:
   a power supplying unit for switching between a small power mode to output a small electric power and a large power mode to output a large electric power;

current detecting means for detecting a current outputted from said power supplying unit;

signal receiving means for receiving a signal transmitted from said electronic equipment; and control means for making said power supplying unit operative in the small power mode and for making said signal receiving means operative when said current detected by said current detecting means is less than or equal to a reference value.

2. The power supplying adapter according to claim 1, wherein said control means controls said small power mode and said large power mode based on said signal received by said signal receiving means.

3. The power supplying adapter according to claim 1, further comprising signal transmitting means for transmitting a signal to said electronic equipment, wherein said signal receiving means receives the signal transmitted from said electronic equipment and determines whether said signal received by said signal receiving means is the signal transmitted from said electronic equipment.

4. A power supplying adapter connectable to electronic equipment by two terminals, comprising:

a power supplying unit for switching between a small power mode to output a small electric power and a large power mode to output a large electric power;

current detecting means for detecting a current outputted from said power supplying unit;

signal transmitting means for transmitting a signal to said electronic equipment; and control means for making said power supplying unit operative in the small power mode and for making said signal transmitting means operative when said current detected by said current detecting means is less than or equal to a reference value.

5. The power supplying adapter according to claim 1 or 4, further comprising stopping means for stopping operation of said power supplying unit in said small power mode or said large power mode.

6. The power supplying adapter according to claim 3 or 4, further comprising high impedance power source means, wherein said high impedance power source means and said power supplying unit are switched and operated, and wherein, when said high impedance power source means operates, the signal is transmitted from said signal transmitting means.

7. Electronic equipment connectable to a power supplying adapter by two terminals, comprising:

signal receiving means for receiving a mode signal transmitted from said power supplying adapter, said mode signal being indicative of a mode of said power supplying adapter;

switching means for disconnecting a power source supplied from said power supplying adapter; and control means for controlling said switching means based on said mode signal received by said signal receiving means.

8. The electronic equipment according to claim 7, further comprising signal transmitting means which is controlled by said control means and transmits a signal to said power supplying adapter.

9. The electronic equipment according to claim 8, wherein said signal receiving means receives the signal transmitted from said power supplying adapter and determines whether said signal received by said signal receiving means is the signal transmitted from said power supplying adapter.

10. A signal transmission system which has a power supplying adapter that is connected to an alternating current power source and generates a predetermined direct current power source voltage and in which said power supplying adapter and electronic equipment are connected by two terminals, wherein said power supplying adapter comprises:

a power supplying unit for switching between a small power mode to output a small electric power and a large power mode to output a large electric power;

current detecting means for detecting a current outputted from said power supplying unit;

signal receiving means for receiving a signal transmitted from said electronic equipment; and first control means for making said power supplying unit operative in the small power mode and for making said signal receiving means operative when said current detected by said current detecting means is less than or equal to a reference value, and said electronic equipment comprises:

signal transmitting means for transmitting a signal to said power supplying adapter;

second control means for controlling said signal transmitting means and for controlling an operation of said electronic equipment; and switching means for disconnecting a power source which is supplied from said power supplying adapter.

11. The signal transmission system according to claim 10, wherein said first control means controls operation of said power supplying unit in said small power mode and said large power mode based on the signal received by said signal receiving means.

12. The signal transmission system according to claim 10, wherein said signal transmitting means is first signal transmitting means and said power supplying adapter further comprises second signal transmitting means for transmitting a signal to said electronic equipment, and wherein said signal receiving means is first signal receiving means and said electronic equipment further comprises second signal receiving means which is controlled by said second control means and which receives the signal transmitted from said power supplying adapter.

13. A signal transmission system which has a power supplying adapter that is connected to an alternating current power source and generates a predetermined direct current power source voltage, said power supplying adapter and electronic equipment being connected by two terminals, wherein said power supplying adapter comprises:

a power supplying unit for switching between a small power mode to output a small electric power and a large power mode to output a large electric power;

current detecting means for detecting a current outputted from said power supplying unit;

signal transmitting means for transmitting a signal to said electronic equipment; and first control means for making said power supplying unit operative in the small power mode and for making said signal transmitting means operative when said current detected by said current detecting means is less than or equal to a reference value, and said electronic equipment comprises:

signal receiving means for receiving a signal transmitted from said power supplying adapter;

second control means for controlling an operation of said electronic equipment based on said signal received by said signal receiving means; and switching means for disconnecting a power source which is supplied from said power supplying adapter.

14. The signal transmission system according to claim 12 or 13, wherein the operation controlled by said second control means is an ON/OFF operation of said switching means, wherein the second control means controls the ON/OFF operation based on the signal received by said signal receiving means of said electronic equipment.

15. The signal transmission system according to claim 12 or 13, further comprising high impedance power source means, wherein said high impedance power source means and said power supplying unit are switched and operated, and wherein, when said high impedance power source means operates, the signal is transmitted from said signal transmitting means of said power supplying adapter.

* * * * *